US011105333B2

(12) United States Patent
Pemberton

(10) Patent No.: US 11,105,333 B2
(45) Date of Patent: Aug. 31, 2021

(54) DOUBLE SUCTION PUMP

(71) Applicant: Pemberton Patents LLC, Gautier, MS (US)

(72) Inventor: Steve V. Pemberton, Gautier, MS (US)

(73) Assignee: PEMBERTON PATENTS LLC, Gautier, MS (US)

(*) Notice: Subject to any disclaimer, the term of this patent is extended or adjusted under 35 U.S.C. 154(b) by 244 days.

(21) Appl. No.: 16/198,465

(22) Filed: Nov. 21, 2018

(65) Prior Publication Data
US 2019/0093660 A1 Mar. 28, 2019

Related U.S. Application Data

(63) Continuation-in-part of application No. 15/006,738, filed on Jan. 26, 2016, now Pat. No. 10,138,891.
(Continued)

(51) Int. Cl.
| *F04D 1/00* | (2006.01) |
| *F04D 13/04* | (2006.01) |
| *F04D 29/043* | (2006.01) |
| *F04D 29/22* | (2006.01) |
| *F04D 13/08* | (2006.01) |

(Continued)

(52) U.S. Cl.
CPC ............. *F04D 1/006* (2013.01); *F04D 13/04* (2013.01); *F04D 13/046* (2013.01); *F04D 13/08* (2013.01); *F04D 17/162* (2013.01); *F04D 29/043* (2013.01); *F04D 29/2222* (2013.01);
(Continued)

(58) Field of Classification Search
CPC ...... F04D 1/006; F04D 29/2222; F04D 13/04; F04D 17/162; F04D 13/046; F04D 13/08; F04D 29/043
See application file for complete search history.

(56) References Cited

U.S. PATENT DOCUMENTS 367,564 A 8/1887 Wade et al.
632,572 A 9/1899 Ivens
(Continued)

FOREIGN PATENT DOCUMENTS

EP 1243889 A1 9/2002
WO 2009025891 A2 2/2009

OTHER PUBLICATIONS

Definition—Mechanical Seal, McGraw-Hill Dictionary of Engineering: Second Edition (Year: 2003).

*Primary Examiner* — Peter J Bertheaud
(74) *Attorney, Agent, or Firm* — Jason P. Mueller; FisherBroyles, LLP

(57) ABSTRACT

A disclosed submersible pump apparatus includes a three-dimensional frame, a pump housing, a drive shaft, an impeller, and first and second motors. The impeller is mounted on the driveshaft within the pump housing and is driven by one or both of the motors. The first motor is connected to a first end of the drive shaft and the second motor connected a second end of the drive shaft. The first and second motors are hydraulic motors and in a first configuration, the first and second motors are configured to cooperatively rotate the drive shaft with hydraulic fluid supplied to and removed from the first and second motors using a parallel fluidic connection. In a second configuration, only one of the motors has a drive gear and drives the drive shaft while the second motor does not have a drive gear and acts as a frictionless bearing supporting the drive shaft.

26 Claims, 18 Drawing Sheets

Related U.S. Application Data

(60) Provisional application No. 62/125,586, filed on Jan. 26, 2015.

(51) Int. Cl.
  *F04D 17/16* (2006.01)
  *F04D 29/70* (2006.01)
  *F04D 29/046* (2006.01)

(52) U.S. Cl.
  CPC .......... *F04D 13/086* (2013.01); *F04D 29/046* (2013.01); *F04D 29/708* (2013.01)

(56) References Cited

U.S. PATENT DOCUMENTS

| | | |
|---|---|---|
| 885,867 A | 4/1908 | Salzer |
| 1,213,461 A | 1/1917 | Cooper |
| 1,586,978 A | 6/1926 | Dorer |
| 1,893,445 A | 1/1933 | Rimele |
| 2,393,127 A | 10/1943 | Summers |
| 2,473,813 A | 6/1949 | Nygren |
| 3,160,107 A | 12/1964 | Ross |
| 3,176,621 A | 4/1965 | Phillips |
| 3,246,605 A | 4/1966 | Fisher |
| 3,817,653 A | 6/1974 | Onal |
| 3,910,715 A | 10/1975 | Yedidiah |
| 3,935,833 A | 2/1976 | Onal |
| 4,050,166 A | 9/1977 | Swiatosz et al. |
| 4,247,250 A | 1/1981 | Lipe et al. |
| 4,344,580 A | 8/1982 | Hoshall et al. |
| 4,518,311 A | 5/1985 | Dernedde et al. |
| 4,688,987 A | 8/1987 | Ericson et al. |
| 4,786,239 A | 11/1988 | Eberhardt |
| 5,122,032 A | 6/1992 | Sheilds et al. |
| 5,980,199 A | 11/1999 | Godichon |
| 6,942,448 B1 | 9/2005 | Pemberton |
| 7,442,033 B2 | 10/2008 | Wang |
| 8,152,443 B1 * | 4/2012 | Pemberton ................ F04D 7/04 415/56.1 |
| 2003/0059293 A1 * | 3/2003 | Chancey ............... F04D 29/628 415/56.1 |
| 2003/0143082 A1 | 7/2003 | Thiriez |
| 2007/0110595 A1 * | 5/2007 | Sato ..................... F04D 13/064 417/351 |
| 2008/0089777 A1 | 4/2008 | Lang |

\* cited by examiner

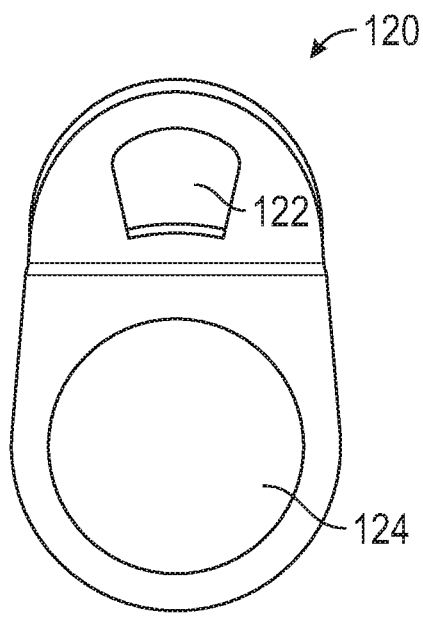 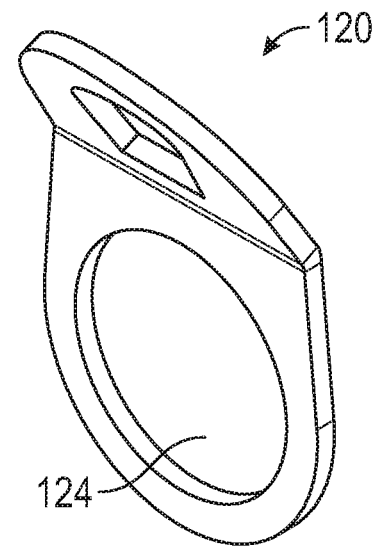 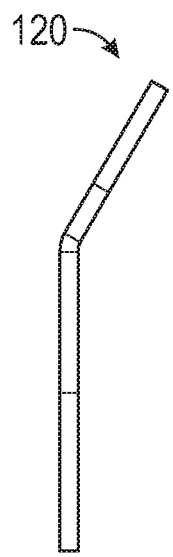
FIG. 23A  FIG. 23B  FIG. 23C
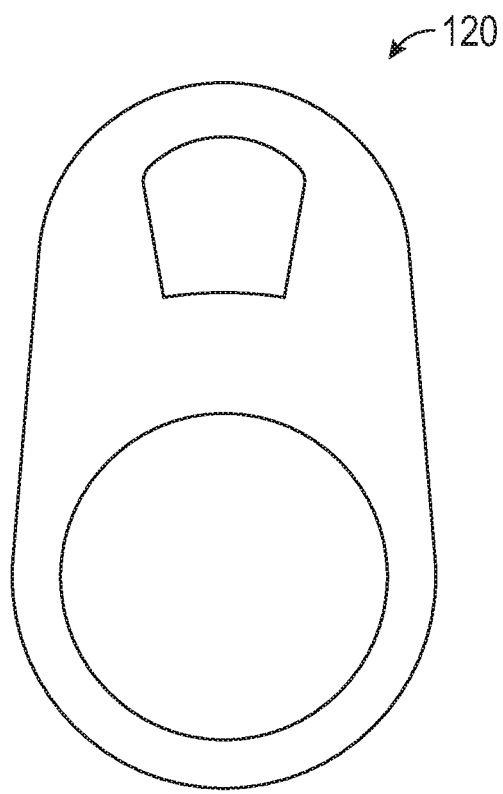
FIG. 24

DOUBLE SUCTION PUMP

CROSS REFERENCE TO RELATED APPLICATIONS

This application is a continuation-in-part of pending U.S. patent application Ser. No. 15/006,738, filed on Jan. 26, 2016, which claims benefit of U.S. Provisional Application No. 62/125,586, filed on Jan. 26, 2015, both of which are incorporated herein by reference.

BRIEF DESCRIPTION OF THE DRAWINGS

The accompanying drawings are part of the present disclosure and are incorporated into the specification. The drawings illustrate examples of embodiments of the disclosure and, in conjunction with the description and claims, serve to explain various principles, features, or aspects of the disclosure. Certain embodiments of the disclosure are described more fully below with reference to the accompanying drawings. However, various aspects of the disclosure may be implemented in many different forms and should not be construed as being limited to the implementations set forth herein. Like numbers refer to like, but not necessarily the same or identical, elements throughout.

FIG. 23A is a first view of a lifting ring, in accordance with one or more embodiments of the disclosure.

FIG. 23B is a second view of a lifting ring, in accordance with one or more embodiments of the disclosure.

FIG. 23C is a third view of a lifting ring, in accordance with one or more embodiments of the disclosure.

FIG. 24 is a two-dimensional projection view of a lifting ring, in accordance with one or more embodiments of the disclosure.

DETAILED DESCRIPTION

This disclosure generally relates to pump apparatuses and methods for pumping high-density, high-viscosity, and/or viscous fluids. Disclosed embodiments are suitable for pumping such fluids from the bottom of a tank or body of water, and other environments where pumping of such fluids is desired.

Process tanks and waste pits are utilized in a variety of industrial settings to store various types of liquids. Some liquids may contain solids, heavy oils, or similar heavy materials. Such heavier materials tend to accumulate at the bottom of a tank or pit in which they are stored. Tanks containing such materials may be required to be pumped dry for cleaning, inspection, change of service, or other reasons, and materials at the bottom of the tank or pit may include viscous fluids, heavy sludge, sand, or other abrasive solids. Similarly, aeration ponds or other similar types of water bodies may accumulate a layer of viscous fluid or sludge at the bottom of the pond or water body. The sludge may form due to various types of solid waste, vegetation, or other types of organic matter found in a water stream. Such heavy or viscous fluids, which may contain solid materials, may be difficult to remove from the bottom of the tank or pond because such fluids may damage or clog conventional pumps. Sand solids are especially difficult to pump as they tend to quickly fall out of suspension and tend to not remain suspended in slurries.

Disclosed embodiments provide various pump apparatuses that are capable of pumping viscous fluids or semi-solid material such as mud, sludge, abrasive sand, and/or other solids-containing materials. Further, disclosed pump apparatuses are portable and submersible. An example pump apparatus may be lowered to the bottom of a tank or pond and may remove heavier material-containing solids that may reside on the bottom of the tank or pond. A disclosed pump apparatus may also be used as a portable dredge pump. Various disclosed pump apparatuses include a double-suction configuration with dual annular inlet openings and optional agitators. The agitators are configured to agitate and macerate solid waste materials so that such materials may be pumped more easily without clogging pump intakes. Disclosed pump apparatuses have no internal bearings, no mechanical seals or wear plates, and thus have little or no internal friction. As such, disclosed pump apparatuses may be run dry for extended periods of time without being damaged.

Figure 1:
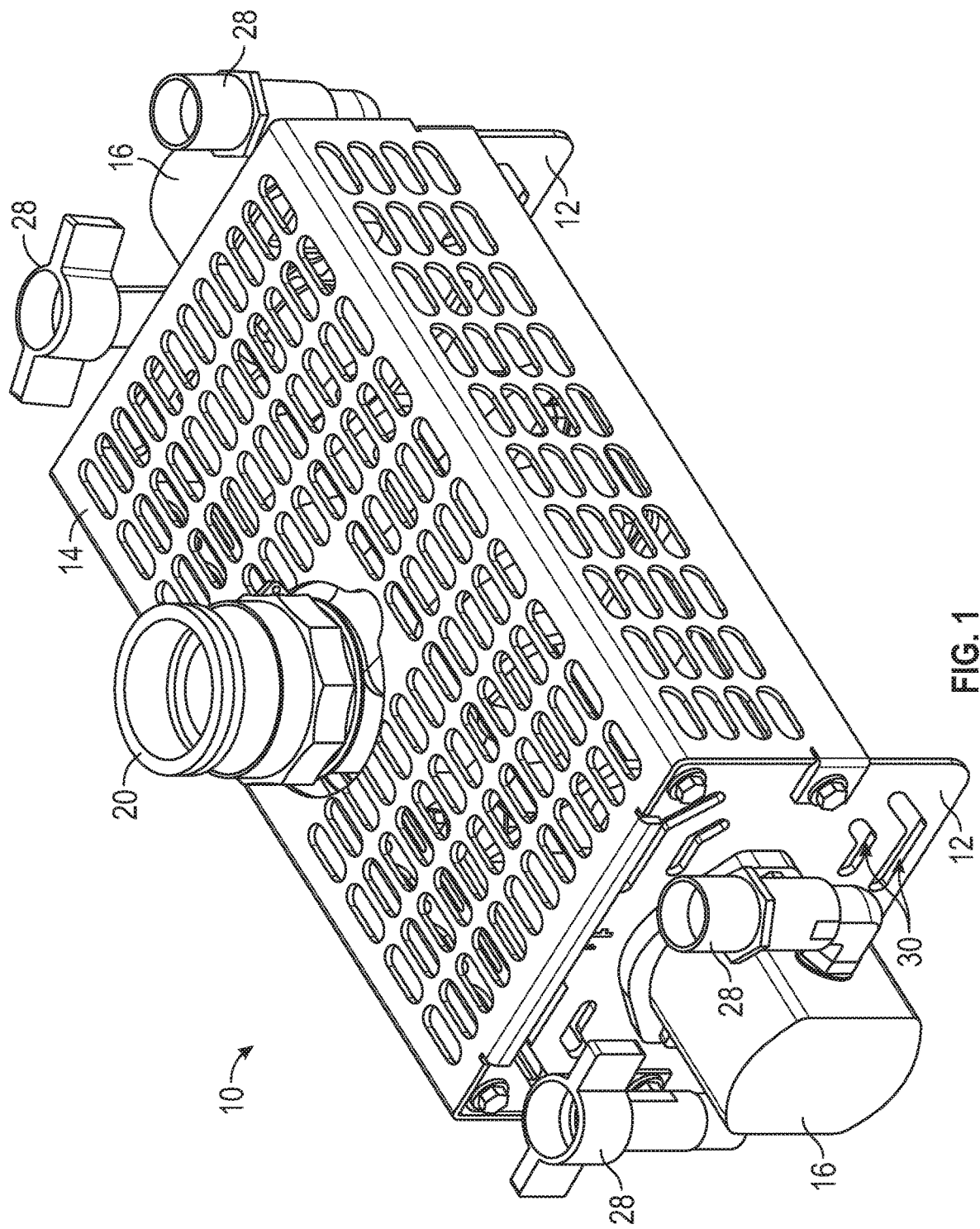
FIG. 1 is a top perspective view of a pump apparatus, in accordance with one or more embodiments of the disclosure.

FIG. 1 is a top perspective view of a pump apparatus 10, in accordance with one or more embodiments of the disclosure. This view illustrates a pump housing that includes a debris cage 14 attached to end plates 12. Two hydraulic motors 16 are attached to end plates 12, which provide mechanical support for hydraulic motors 16. Hydraulic motors 16 are driven by hydraulic fluid that is supplied by fluid connection ports 28. FIG. 1 also shows a discharge outlet 20 that may be connected to a hose (not shown). End plates 12 further include a plurality of suction openings 30 extending through end plates 12.

Figure 2:
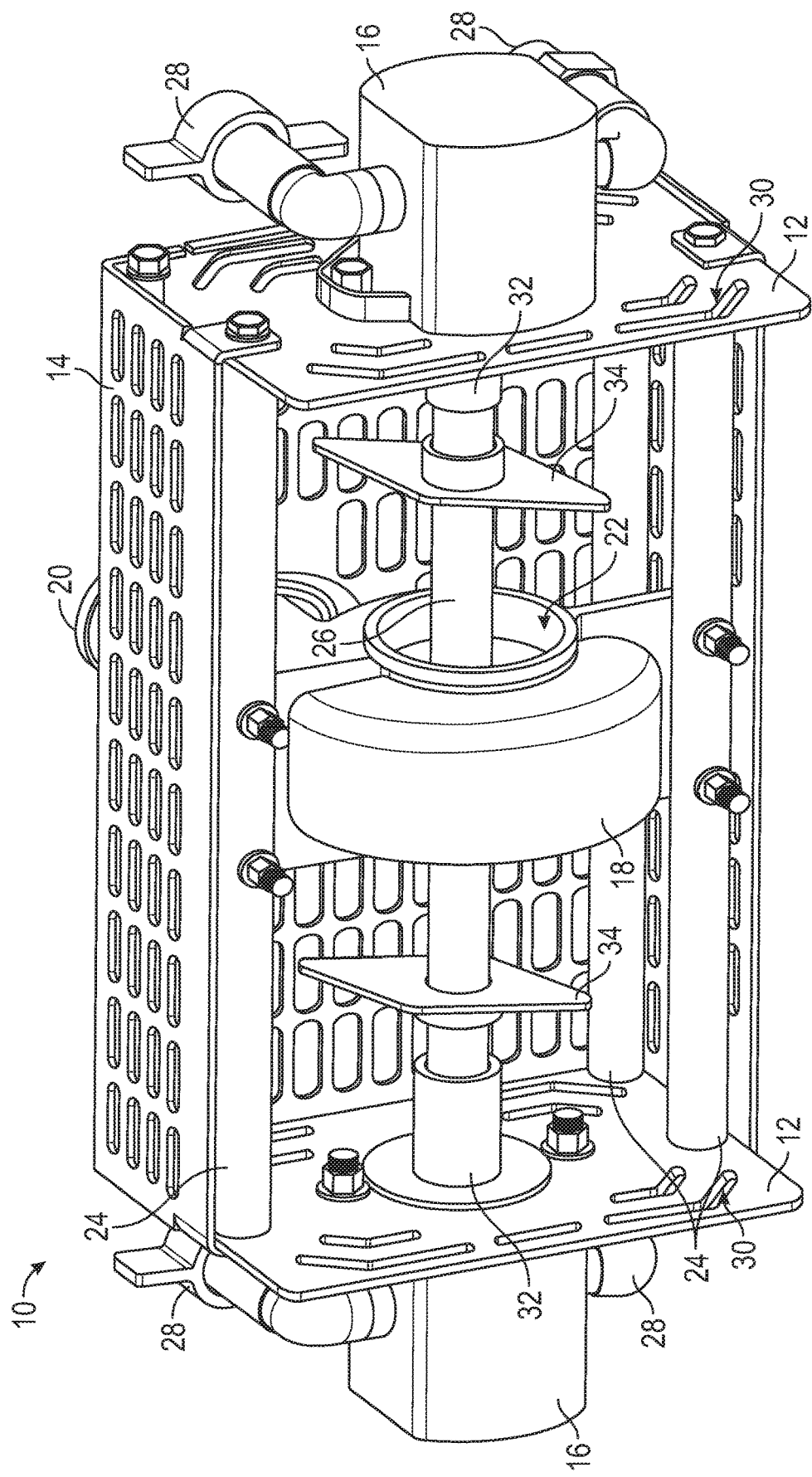
FIG. 2 is a bottom perspective view of a pump apparatus, in accordance with one or more embodiments of the disclosure.

Debris cage 14 is provided for worker hand protection (e.g., protection from injury due to agitators 34 as shown in FIG. 2) and to prevent large debris from entering pump apparatus 10. Debris cage 14 is configured to partially surround pump apparatus 10 while leaving a bottom portion of pump apparatus 10 exposed to allow flow of material to be drawn from the bottom of pump apparatus 10 where solids may be located. In further embodiments, a full debris cage may be provided (not shown) for applications in which rocks or unknown solid objects may be present. Debris cage 14 has slots that allow material to flow into pump apparatus 10 having sizes that can be accommodated by pump apparatus 10 while blocking larger material (e.g., one-inch sized rocks) that could potentially damage pump apparatus 10. Further embodiments that do not have a debris cage 14 (e.g., see FIGS. 13, 14, 18, and 25) may be used for applications such as pit pumping/cleaning where rocks and other such large debris is not expected to be present.

Suction openings 30 allow flowable material to pass through end plates 12 as fluid is drawn into pump apparatus 10. As described in greater detail below, fluid that is drawn into pump apparatus 10 flows through openings in debris cage 14 and/or suction openings 30 and is pumped out through the discharge outlet 20. Suction openings 30 help to reduce turbulence or cavitation at pump inlet openings 22 (e.g., see FIG. 2). Suction openings 30 increase laminar flow of fluid into pump apparatus 10 and prevent damage from rocks and other pieces of hard material. The size of suction openings 30 is designed such that pump apparatus 10 can handle anything that is small enough to pass through suction openings 30, including gravel having pea-sized particles.

FIG. 2 is a bottom perspective view of pump apparatus 10 of FIG. 1 in accordance with one or more embodiments of the disclosure. This view illustrates a pump housing 18 disposed within a three-dimensional frame that includes debris cage 14, end plates 12, and crossbars 24. Crossbars 24 are secured to end plates 12 and provide further support for debris cage 14 and pump housing 18, which is also secured to crossbars 24. As shown in FIG. 2, each crossbar 24 has two ends, and each end is attached to a respective end plate 12. In this example, pump apparatus 10 includes four crossbars 24 configured to form a three-dimensional rectangular frame when secured to end plates 12. Pump housing 18 is mounted inside the frame using fasteners. For example, pump housing 18 may be bolted to crossbars 24 as shown in FIG. 2. Pump housing 18 may be configured to be equidistant from each end plate 12. End plates 12 and crossbars 24 provide a frame that stabilizes the assembly and keeps the structure of pump apparatus 10 rigid so that vibration or cavitation tends to not damage pump apparatus 10. As mentioned above, debris cage 14, along with end plates 12 and cross bars 24, forms a frame that provides mechanical stability for pump apparatus 10. Debris cage 14 may be secured to crossbars 24, end plates 12, or both.

As shown in FIG. 2, pump housing 18 includes opposing inlet openings 22 on each side of housing 18. Inlet openings 22 may be configured to allow flowable material to be drawn into pump housing 18 through openings 22 and to be pumped out of discharge outlet 20. Pump housing 18 includes an impeller 40 (e.g., see FIGS. 4 to 8 and related description below) that acts to draw fluid in through inlet openings 22 and to force it out through discharge outlet 20. Impeller 40 is mounted on a drive shaft 26 within pump housing 18 and is configured to have a spaced relationship with pump housing 18 such that neither impeller 40 nor drive shaft 26 comes into contact with pump housing 18, as described in greater detail below. In this example, drive shaft 26 extends through both opposing inlet openings 22 of pump housing 18 in a spaced, non-contacting relationship to pump housing 18. Drive shaft 26 further extends through an opening (not shown) in each end plate 12. Each end of drive shaft 26 is connected to a respective hydraulic motor 16 via a coupling 32.

As shown in FIG. 2, pump apparatus 10 may further include a plurality of mechanical agitators 34 attached to drive shaft 26. At least one agitator 34 may be positioned on each side of the inlet openings 22 of the pump housing 18. In an embodiment, one agitator 34 may be utilized on each side of pump housing 18, for a total of two agitators 34. In other embodiments, additional agitators 34 may be provided on each side of the inlet openings 22, depending on the application. In other embodiments, agitators 34 may be omitted. Each agitator 34 may include a diamond-shape plate. As shown in FIG. 2, for example, each agitator 34 may be attached to drive shaft 26 at an oblique angle with respect to an axis of drive shaft 26. Agitators 34 may be made of high-strength steel and may be spin-balanced and mounted on drive shaft 26. Drive shaft 26 may be configured to have keyways (not shown) to hold agitators 34 in place. While pump apparatus 10 is operating, agitators tend to macerate solid waste, vegetation, and organic matter and to agitate fluids to keep dense particles in suspension. Agitators 34 may also help to feed solids into inlet openings 22.

For certain fluids, agitators 34 may act to macerate solid materials to generate a fine slurry having suspended solid material of reduced size. Such a slurry may then be pumped without clogging pump inlet openings 22 and other components of pump housing 18 and discharge outlet 20. In further embodiments, agitators 34 may have sharpened edges. Embodiments with agitators 34 having sharp edges may be used in applications in which it is desirable to cut solid materials into smaller pieces. In such applications, solid materials may include large pieces of vegetation or other materials that could, in the absence of agitators, otherwise damage the pump. In other applications, agitators 34 having blunt edges may be used in situations in which abrasive solids are present. The use of such agitators 34 having blunt edges may tend to keep abrasive solids suspended as a slurry.

Figure 3:
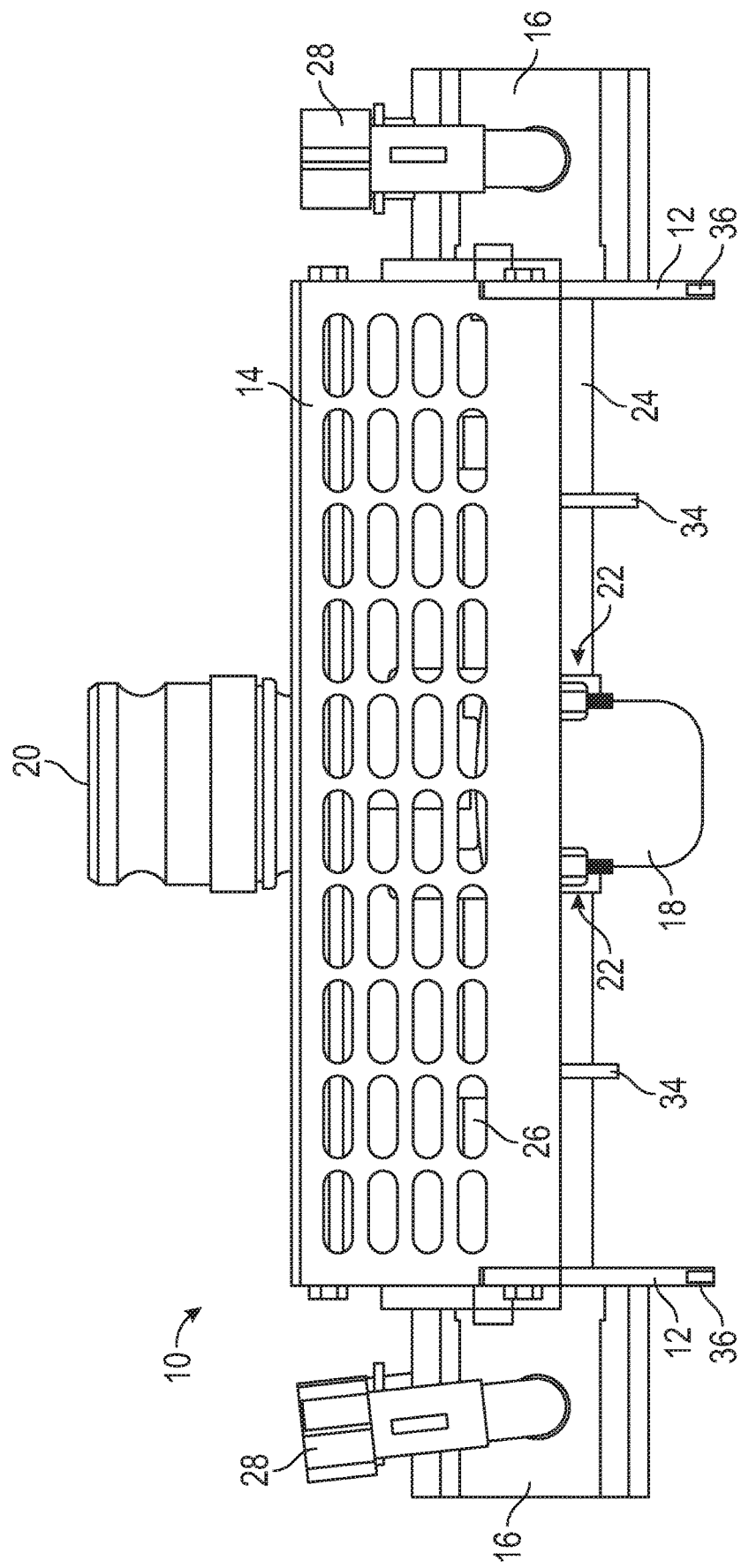
FIG. 3 is a side view of a pump apparatus, in accordance with one or more embodiments of the disclosure.

FIG. 3 is a side view of pump apparatus 10 shown in FIGS. 1 and 2, in accordance with one or more embodiments of the disclosure. A bottom side of pump apparatus 10 is configured to be open, as shown in FIG. 2. Cage 14 allows flowable fluids, including solids, to flow through openings in cage 14 but generally blocks larger debris or other solid objects that could potentially damage pump apparatus 10. According to an embodiment, end plates 12, crossbars 24, and cage 14 may be made of aluminum, stainless steel, or other suitable material depending on the intended application. In this example, cage 14 does not extend all the way down each side of end plates 12. In this regard, bottom edges 36 of end plates 12 may act as feet that support pump apparatus 10 above a surface on which pump apparatus 10 is placed, such as when pump apparatus 10 is placed on a bottom surface of a tank or pond. This configuration allows some sludge or other organic matter resting on the bottom of the tank or pond to be drawn under cage 14 while cage 14 prevents large debris from entering pump housing 18.

Figure 4:
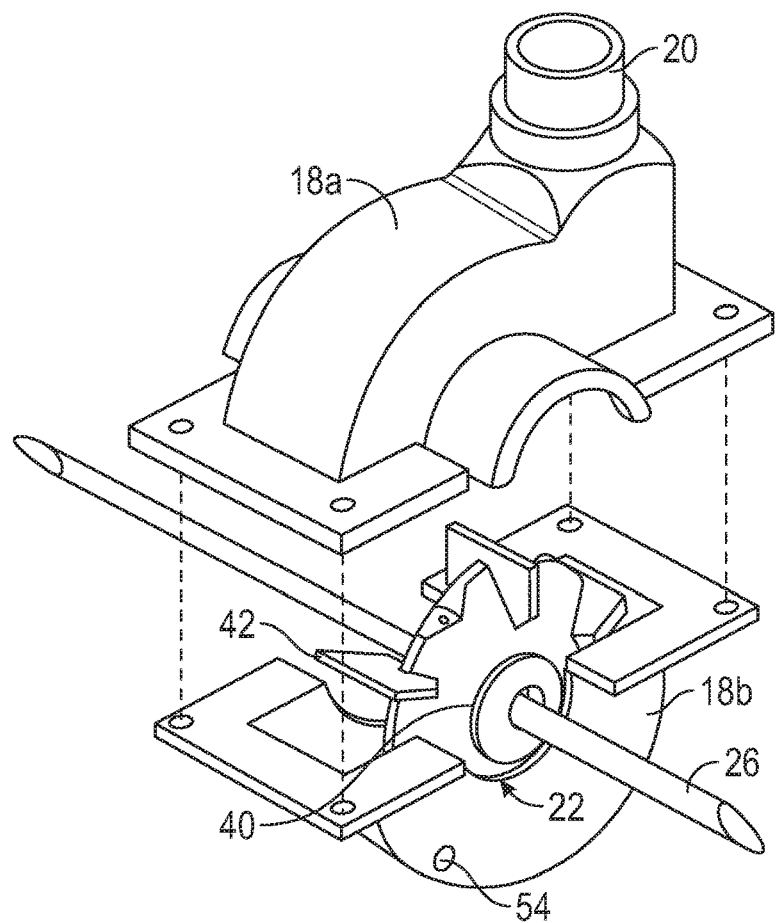
FIG. 4 is an exploded view of a pump housing, in accordance with one or more embodiments of the disclosure.

FIG. 4 is an exploded view of pump housing 18, shown in FIGS. 2 and 3, in accordance with one or more embodiments of the disclosure. As described above with reference to FIG. 2, pump housing 18 may be mounted to cross bars 24 within pump apparatus 10. In this example, pump housing 18 is a split housing including an upper housing 18a and a lower housing 18b that are configured to be bolted or otherwise fastened together to form pump housing 18. Upper housing 18a includes discharge outlet 20, as mentioned above. As shown in FIGS. 1 to 3, discharge outlet 20 extends outwardly from housing 18 and further extends upward through an opening (e.g., see FIG. 1) in cage 14. A hose (not shown) may be connected to discharge outlet 20 so that flowable material may be discharged through outlet 20 and transferred to a desired location. Lower housing 18b includes a drainage port 54 that may be used for draining pump housing 18 for maintenance or when pump apparatus 10 is not in use.

As described above, and shown in FIG. 4, impeller 40 is mounted on drive shaft 26 within pump housing 18 and is configured to have a spaced relationship with the pump housing 18 such that neither impeller 40 nor drive shaft 26 comes into contact with pump housing 18. In an embodiment, impeller 40 may be configured to have a clearance of about 3/16 inch to about 1/4 inch from the pump housing 18. Other embodiments may include different dimensions for clearance of impeller 40 and drive shaft 26. As described above, when assembled, pump housing 18 has opposing inlet openings 22 on each side of the housing 18, as shown in FIGS. 2, 3, and 4. Inlet openings 22 have an annular shape and are configured to allow flowable material to be drawn into pump housing 18 through inlet openings 22 and to be pumped out of discharge outlet 20, as described above.

Drive shaft 26 may be mounted within pump apparatus 10 with respective ends of drive shaft 26 connected to respective hydraulic motors 16 as shown, for example, in FIG. 2. In this way, one or both hydraulic motors 16 may be configured to impart rotational motion to drive shaft 26. In this example, hydraulic motors 16 are attached to an exterior surface of respective end plates 12. As shown in FIGS. 2 and 4, for example, drive shaft 26 is configured to extend through both of opposing inlet openings 22 of pump housing 18 in a spaced, non-contacting relationship to pump housing 18. Drive shaft 26 may further be configured to extend through respective openings (not shown) in each end plate 12 so that respective ends of drive shaft 26 may be connected to respective hydraulic motors 16 via a coupling 32 (e.g., see FIG. 2). Hoses (not shown) for hydraulic fluid may be attached to fluid connection ports 28 to supply a forced flow of hydraulic fluid to drive hydraulic motors 16.

In one embodiment, both hydraulic motors 16 (e.g., see FIGS. 1 to 3) may be configured to cooperatively drive impeller 40 by imparting rotational motion to drive shaft 26. The use of dual hydraulic motors 16, which are driven by hydraulic fluid supplied by fluid connection ports 28, eliminates the need for shaft bearings to support drive shaft 26. Embodiments without shaft bearings are advantageous when pumping abrasive solids because abrasive solids might otherwise cause damage to shaft bearings if such bearing were present. The elimination of shaft bearings also minimizes internal friction and allows pump apparatus 10 to run dry for extended or indefinite periods at maximum speed without causing damage to the pump. An absence of shaft bearings also minimizes a potential for low-flow cavitation damage from frequent loading and unloading of pump apparatus 10. Further, disclosed embodiments such as those illustrated in FIGS. 1 to 5 do not require mechanical seals or wear plates and are thus shown with no mechanical seals or wear plates. In further embodiments, pump apparatus 10 may be configured to be driven by only a single hydraulic motor 16, as described in greater detail below.

In alternative embodiments, pump apparatus 10 may be configured to include an electric motor, or a direct drive shaft that is coupled to an internal-combustion engine, which may be configured to provide rotational motion to drive shaft 26. Drive shaft 26 may be configured to have either spline shaft connections or keyed couplings, depending on the type of drive motor utilized with pump apparatus 10. For electric motors, a coupling or a male spline shaft may be inserted into a female spline that is built into the electric motor, which may eliminate the need for a coupling. For hydraulic drive motors, a keyed coupling 32 may be installed between each hydraulic motor 16 and drive shaft 26. Hydraulic motors 16 may be powered by a hydraulic power unit (HPU) (not shown) that supplies a forced flow of hydraulic fluid to fluid connection ports 28 of hydraulic pumps 16.

Pump apparatus 10 provides a number of advantages over conventional pump designs. The double-suction impeller 40, when used in pump apparatus 10, may function as a strong fan that may pull a vacuum, self-prime, and begin pumping. Further, impeller 40 does not have tight tolerances, which allows passage of abrasive solids with a minimal amount of erosional wear. Pump apparatus 10 may run wet or dry and pump in forward or reverse directions without damaging the pump. The double-suction impeller 40 design eliminates thrust loading of impeller 40 by eliminating a differential pressure across the impeller. During operation, fluid pressure is equal on both sides of impeller 40 because impeller 40 is configured to pull flow from both sides. The equalized pressure eliminates a need for mechanical seals and wear plates, and consequently pump apparatus 10 operates with little or no internal friction. Pump apparatus 10 provides high flow rates and high vertical head pressure. Pump apparatus 10 produces variable speed and flow with greater efficiency and reliability, relative to conventional pumps, for severe service applications requiring pumping, mixing, and macerating of non-miscible fluids.

As described in greater detail below, pump apparatus 10 has a double sided, two-piece split impeller configuration (e.g., see impeller 42 of FIG. 5 and impeller 56 of FIGS. 6 to 8) that accepts inlet flow from both sides of the impeller. Fluids are pulled together from both inlet openings 22 and are thereby mixed inside the pump housing 18. Conventional pumps do not mix fluids in this way. Double sided impeller, 42 or 56, may have a straight-vane, curved, or tapered-vane design. Double suction impeller, 42 or 56, is not affected by thrust loading because differential pressure created when from pulling fluids into both sides of the pump is equalized. Impeller, 42 or 56, makes no contact with pump housing 18 thus minimizing internal friction and erosional wear. The impeller hub area, having flat portion 52 was reduced and impeller blades removed from the center, creating a better low pressure area with less turbulence relative to previous embodiments.

Double suction pump 10 produces significantly larger flow rates than other similar size conventional pumps. For example, pump apparatus 10, having a three-inch discharge outlet 20 with twin inlet openings 20, with a small six-inch impeller, 42 or 56, is configured to pump up to 600 gallons/minute of fluid, which is nearly double the flow rate of comparable conventional pumps. Further, pump apparatus 10 is configured to pump fluids including heavy, abrasive slurry/solids, and other viscous fluids.

Figure 5:
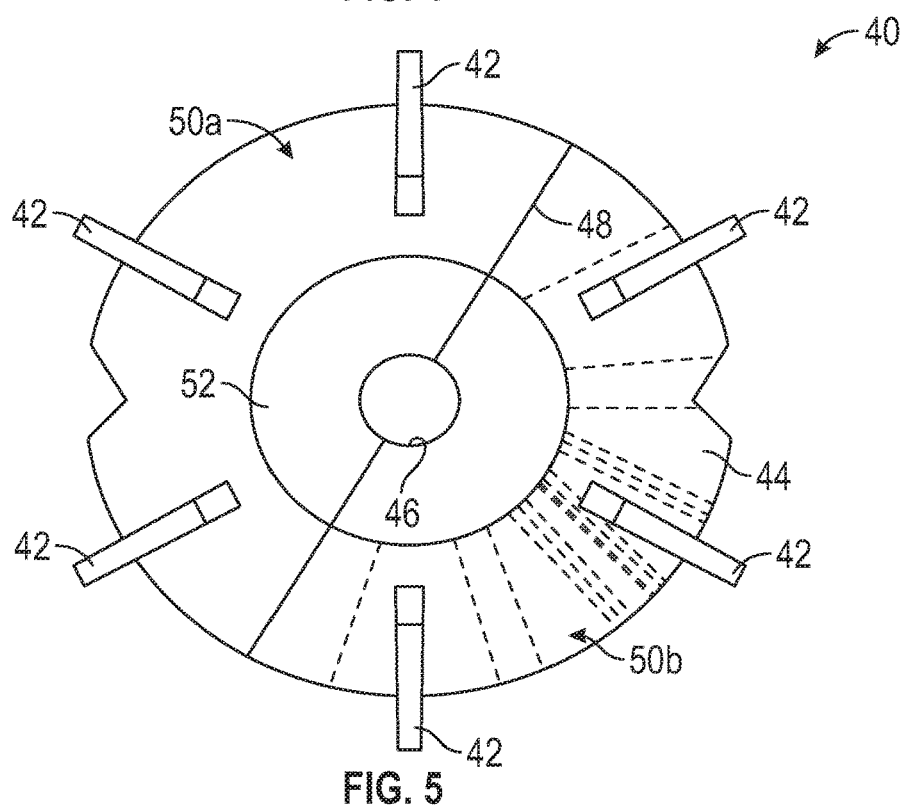
FIG. 5 is a side view of an impeller, in accordance with one or more embodiments of the disclosure.

FIG. 5 is a side view of impeller 40, in accordance with one or more embodiments of the disclosure. Impeller 40 has outwardly extending blades 42 that impart motion to flowable material during operation of pump apparatus 10. In this regard, during operation, drive shaft 26 is caused to rotate by rotational forces imparted to drive shaft 26 by hydraulic motors 16. A spinning motion of drive shaft 26 imparts a similar spinning motion to impeller 40 which, in turn, causes blades 42 to move and thus pump flowable material. As such, motion of impeller blades 42 causes flowable material to be drawn into pump apparatus 10 and into inlet openings 22. Flowable material drawn into inlets openings 22 by moving blades 42 is then forced out of pump housing through discharge outlet 20.

In this example, blades 42 are configured to have a diminishing thickness as a function of distance from the center of impeller 40. The blades 42 are straight in this example embodiment but may be configured to be curved in other embodiments. In this example, impeller 40 includes two halves, 50a and 50b, which may be joined together along line or seam 48. For example, halves 50a and 50b may be joined by welding. In another embodiments, halves 50a and 50b of impeller 40 may be fastened together to generate a compression fit to drive shaft 26, as described in greater detail below. For example, halves 50a and 50b may be bolted together to generate the compression fit to the drive shaft 26.

Impeller 40 may be configured to include an opening or channel 46, which may be keyed for use with the drive shaft 26. Both sides of the impeller 40 may be configured to have a sloped surface 44 and a flat portion 52. Sloped surface 44 may have a profile such that a thickness of impeller 40 decreases outwardly along sloped surface 44 moving away from opening or channel 46. Sloped surface 44 of impeller 40 may be configured to have a slope of about 30° to about 45° degrees relative to the flat portion. The sloped surface 44 may be formed by various material processing operations. For example, halves 50a and 50b may be cast to include the sloped surface 44. In other embodiments, other material processing techniques, such as grinding or shearing, may be used to generate sloped surface 44. Impeller 40 may be configured to have a similar sloped surface 44 on a back side (not shown) of impeller 40. During operation, sloped surfaces 44 on each side of impeller 40 may be configured to move flowable material outwardly toward blades 42. In turn, moving blades 42 cause movement of flowable material toward discharge outlet 20.

According to an embodiment, blades 42 may be attached to sloped surface 44. In this regard, blades 42 may be fabricated as pieces that are separate from halves 50a and 50b and may then be mechanically attached to halves 50a and 50b. For example, blades 42 may be joined to halves 50a and 50b through welding. Alternatively, blades 42 may be fastened to halves 50a and 50b using fasteners such as bolts. In further embodiments, blades 42 may be generated as integral features of halves 50a and 50a when halves 50a and 50b are manufactured (e.g., by casting).

Figure 6:
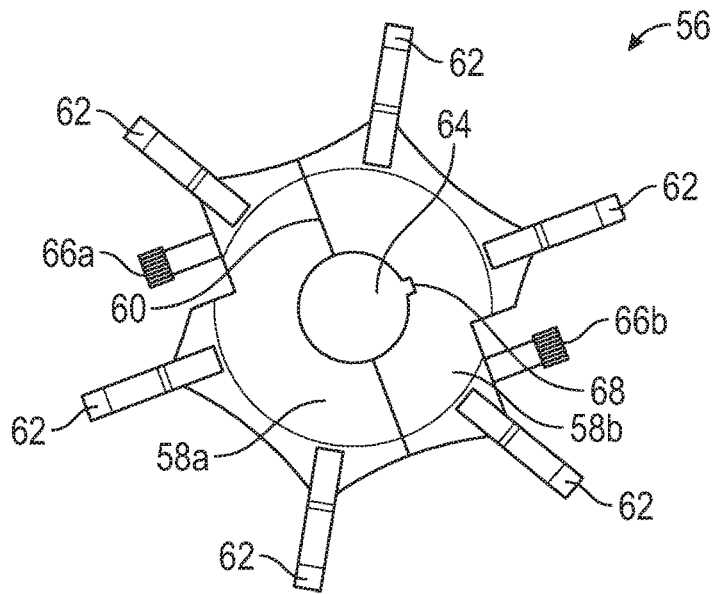
FIG. 6 is a side view of an impeller, in accordance with one or more embodiments of the disclosure.

FIG. 6 is a side view of impeller 56 in accordance with a further embodiment of the disclosure. Impeller 56 includes two halves 58a and 58b that may be joined along dividing line or seam 60. Like impeller 40, impeller 56 has blades 62 extending radially outwardly from an opening or channel 64. Impeller 56 is configured with screw fasteners 66a and 66b that may be used to mount impeller 56 on a drive shaft, such as drive shaft 26 or an additional drive shaft embodiment as described below. Screw fasteners 66a and 66b may be used to couple halves 58a and 58b to form a compression fit with a drive shaft. Impeller 56 further includes a keyway 68 to hold impeller 56 to a drive shaft using a key 72 (e.g., see FIG. 9) that couples keyway 68 on impeller 56 with a corresponding key 72 on a drive shaft, as described in greater detail below and illustrated, for example, in FIG. 9.

Figure 7:
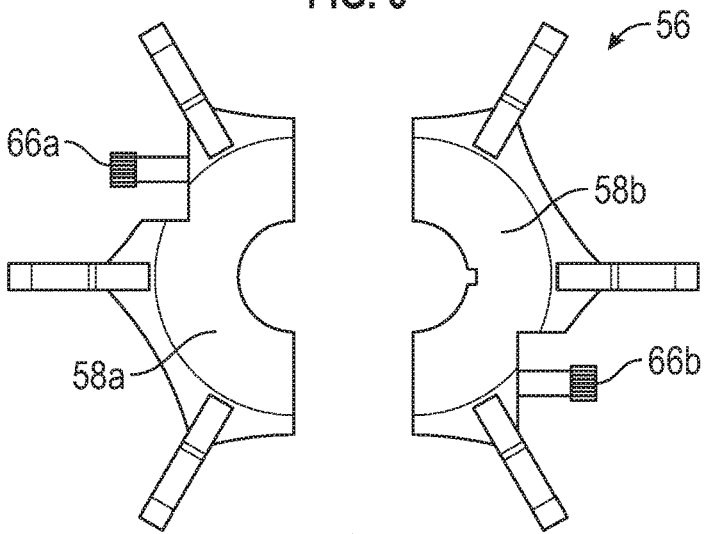
FIG. 7 is an exploded side view of the impeller shown in FIG. 6, in accordance with one or more embodiments of the disclosure.

FIG. 7 is an exploded side view of impeller 56 shown in FIG. 6, in accordance with one or more embodiments of the disclosure. In this view, halves 58a and 58b of impeller 56 are shown in a separated configuration. Also, in this view, screw fasteners 66a and 66b are shown in a retracted configuration. When installed, halves 58a and 58b may be held together in a closed configuration by screw fasteners 66a and 66b. In this regard, screw fastener 66a of half 58a may engage with a corresponding screw hole (not shown) in half 58b. Similarly, screw fastener 66b in half 58b may engage with a corresponding screw hole (not shown) of half 58a.

Figure 8:
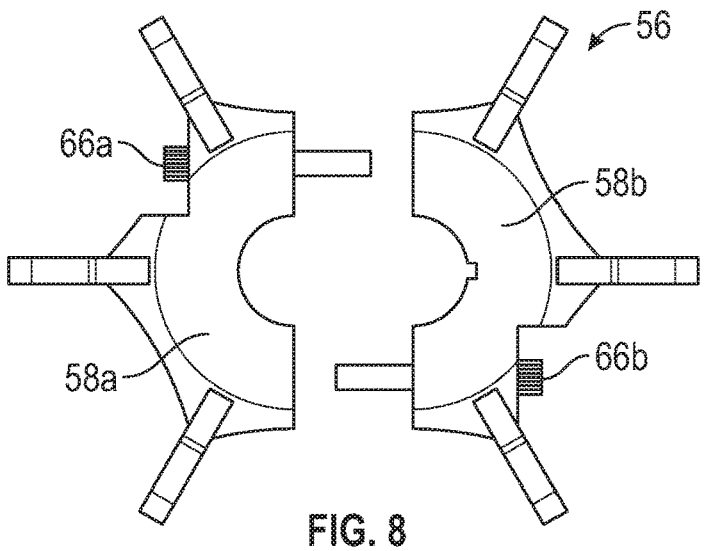
FIG. 8 is an exploded side view of the impeller shown in FIG. 6, in accordance with one or more embodiments of the disclosure.

FIG. 8 is another exploded side view of impeller 56 shown in FIG. 6, in accordance with one or more embodiments of the disclosure. In this view, screw fasteners 66a and 66b are shown in an engaged configuration with screw fasteners 66a and 66b screwed into respective halves 58a and 58b. When halves 58a and 58b are in a closed configuration, the engaged (i.e., screwed-in) configuration of screw fasteners 66a and 66b fastens halves 58a and 58b together.

Figure 9:
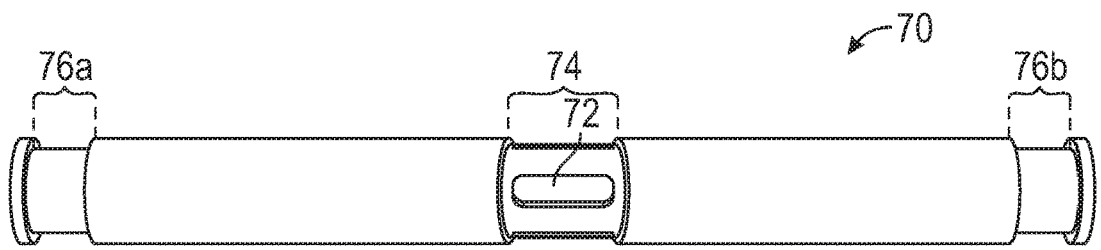
FIG. 9 is a side view of a drive discharge tube, in accordance with one or more embodiments of the disclosure.

FIG. 9 is a side view of a drive shaft 70, in accordance with one or more embodiments of the disclosure. Drive shaft 70 includes a key 72 that is configured to engage with keyway 68 of impeller 56 (e.g., see FIG. 6). Drive shaft 70 is also bored to have shoulders 74 that engage and confine impeller 56 when impeller 56 is installed on drive shaft 70. In this way, impeller 56 may be held in place by shoulders 74, keyway 68 and key 72, as well as by a compression fit imposed by screw fasteners 66a and 66b, described above and illustrated, for example, in FIGS. 6 to 8. Drive shaft 70 is also bored at both ends to provide shoulders 76a and 76b for engaging drive shaft 70 with a motor shaft (e.g., see FIGS. 26 to 28) of hydraulic motors 16, described above with reference to FIGS. 1 to 3 and described in greater detail below.

Figure 10:
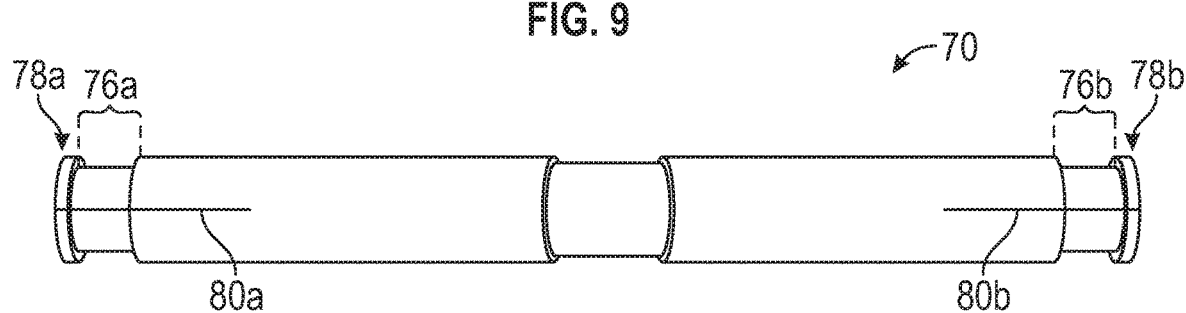
FIG. 10 is a side view of the drive shaft shown in FIG. 9, in accordance with one or more embodiments of the disclosure.

FIG. 10 is a side view of drive shaft 70 shown in FIG. 9, in accordance with one or more embodiments of the disclosure. FIG. 10 illustrates drive shaft 70 in a rotated configuration relative to the view shown in FIG. 9. In this view, end portions 78a and 78b are shown to each have a split configuration. In this regard, end portions 78a and 78b each have respective mechanical cut regions 80a and 80b. Cut regions 80a and 80b are part of a mechanical configuration of end portions 78a and 78b that provide a coupling with respective motors 16, as shown in FIG. 11 and described in greater detail below.

Figure 11:
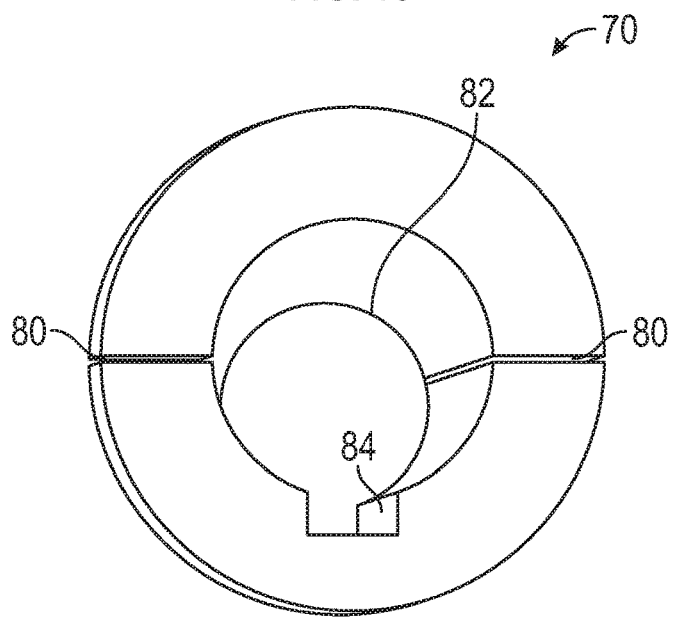
FIG. 11 is an end view of an end portion of the drive shaft shown in FIG. 10, in accordance with one or more embodiments of the disclosure.

FIG. 11 is an end view of end portion 78a or 78b of drive shaft 70 shown above in FIGS. 9 and 10, in accordance with one or more embodiments of the disclosure. Drive shaft 70, as shown in FIG. 11, has a bored hole region 82 that is configured to allow a motor shaft (e.g., motor shaft 128 of FIGS. 26 to 28) to fit inside of the bored hole region 82 of drive shaft 70. As shown, drive shaft 70 also has a keyway 84 that is configured to engage with a corresponding key 130 (e.g., see FIG. 26) of a motor shaft (e.g., motor shaft 128 of FIG. 26). Cut region 80 allows compression of the end of drive shaft 70 when a compression ring (not shown) is installed in shoulder regions 76a and 76b of drive shaft 70. Thus, drive shaft 70 is configured to engage with a motor shaft via both a compression fit and a key/keyway fit.

Figure 12:
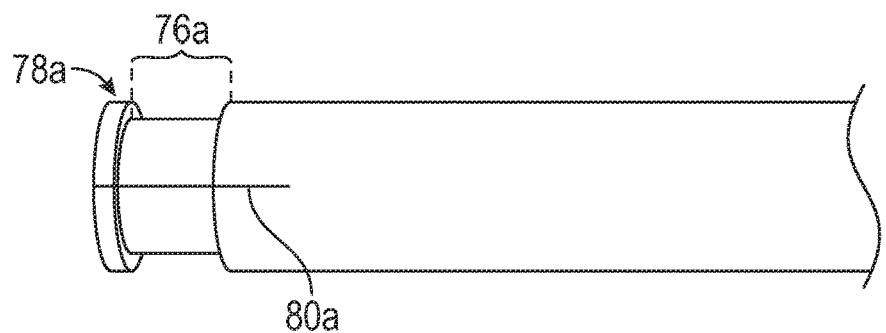
FIG. 12 is an enlarged side view of the drive shaft shown in FIG. 10, in accordance with one or more embodiments of the disclosure.

FIG. 12 is an enlarged side view of drive shaft 70 shown in FIG. 10, in accordance with one or more embodiments of the disclosure. This view provides an enlarged view of cut region 80a of end portion 78a. Shoulder region 76a is also shown in greater detail.

Figure 13:
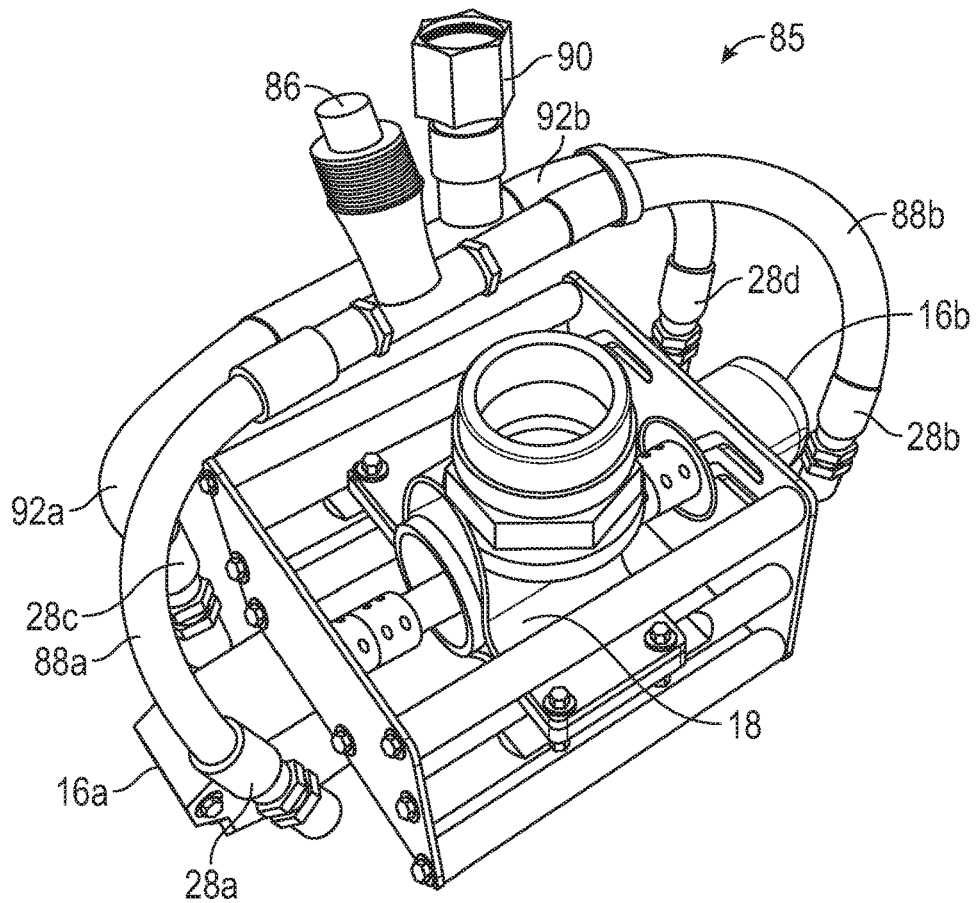
FIG. 13 is a top perspective view of a pump apparatus, in accordance with one or more embodiments of the disclosure.

FIG. 13 is a top perspective view of a pump apparatus 85, in accordance with one or more embodiments of the disclosure. In this embodiment, as described above, both hydraulic motors 16 (e.g., also see FIGS. 1 to 3) may be configured to cooperatively drive an impeller (e.g., impeller 40 or impeller 56 of FIGS. 5 and 6 respectively) by imparting rotational motion to a drive shaft (e.g., drive shaft 26 or drive shaft 70 of FIG. 4 or 9 respectively). The use of dual hydraulic motors 16, which are driven by hydraulic fluid supplied by fluid connection ports 28, eliminates the need for shaft bearings to support drive shaft 26. In this example, hydraulic fluid is supplied to hydraulic pumps 16a and 16b through respective fluid connection ports 28a and 28b from a common input supply line 86 that is connected to fluid connection ports 28a and 28b in a parallel connection using respective supply hoses 88a and 88b. Similarly, hydraulic fluid may be removed from respective hydraulic pumps 16a and 16b through fluid connection ports 28c and 28d from a common fluid return line 90 that is connected to respective return hoses 92a and 92b.

Figure 14:
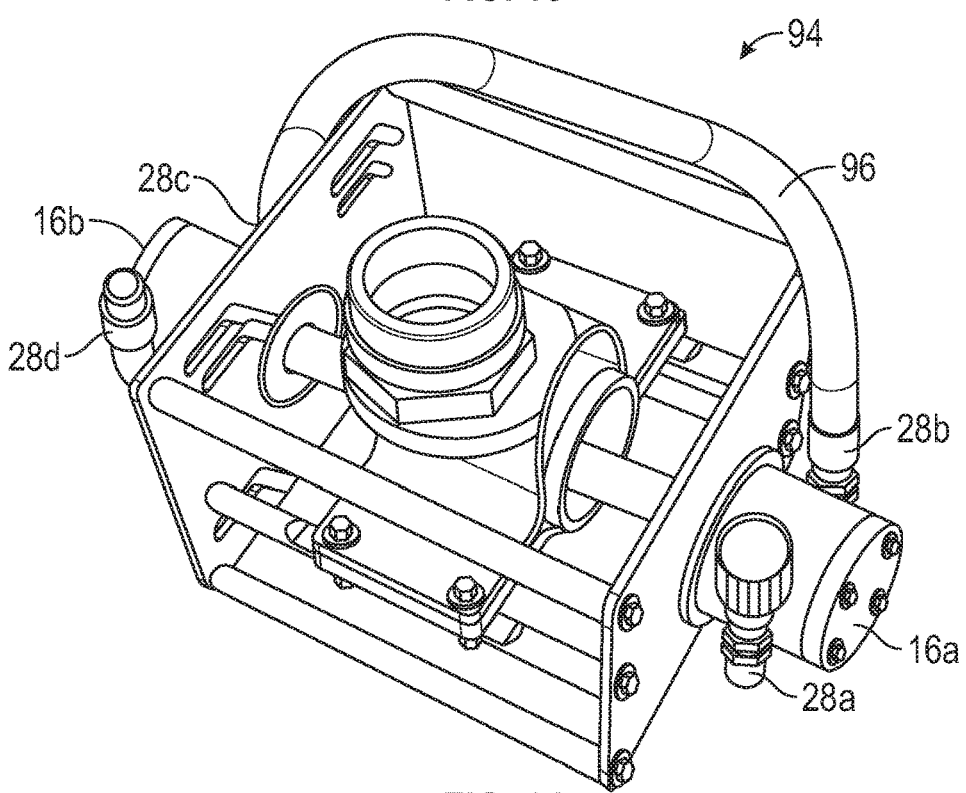
FIG. 14 is a top perspective view of a pump apparatus, in accordance with one or more embodiments of the disclosure.

FIG. 14 is a top perspective view of a pump apparatus 94, in accordance with one or more embodiments of the disclosure. Pump apparatus 94 is configured so that the only one of the hydraulic pumps 16a is used to drive an impeller (not shown). In this configuration, motor 16a includes a drive gear (e.g., illustrated in FIG. 27 and described below) that generates rotational motion in a drive shaft in response to forced motion of hydraulic fluid that is fed into hydraulic motor 16a through fluid connection port 28b. In this configuration, the second hydraulic motor 16b is in a configuration in which a drive gear has been removed (e.g., illustrated in FIG. 28 and described below). As such, hydraulic motor 16b acts as a frictionless external bearing that supports a drive shaft but does not perform work on the drive shaft. In this example, fluid leaves hydraulic motor 16a through fluid connection port 28b and is routed in a serial configuration to hydraulic motor 16b through supply hose 96. Hydraulic fluid then enters hydraulic motor 16b through fluid connection port 28c (partially obscured in the view of FIG. 14). Fluid entering hydraulic motor 16b from fluid connection port 28c flows through hydraulic motor 16b and cools and lubricates hydraulic motor 16b. Fluid then leaves hydraulic motor 16b through fluid connection port 28d and is returned to the external hydraulic system through a fluid return line (not shown).

Figure 15:
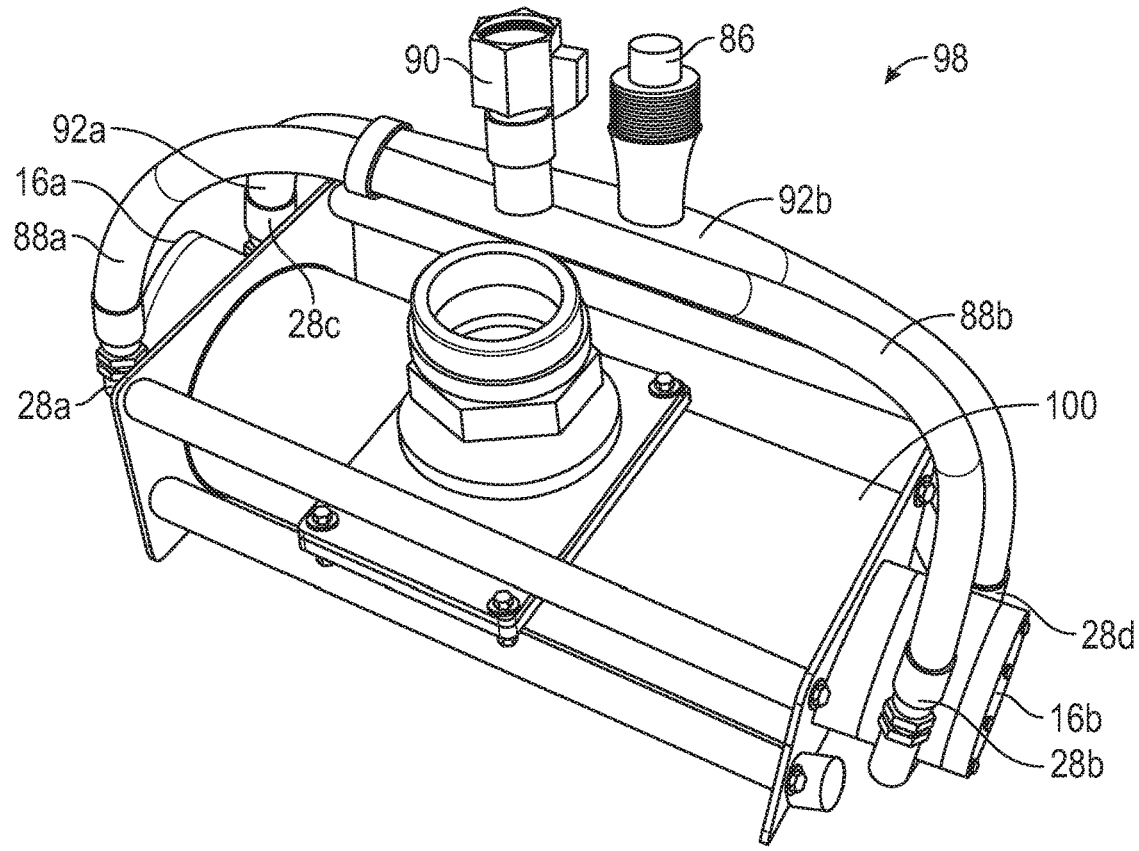
FIG. 15 is a top perspective view of a pump apparatus, in accordance with one or more embodiments of the disclosure.
Figure 16:
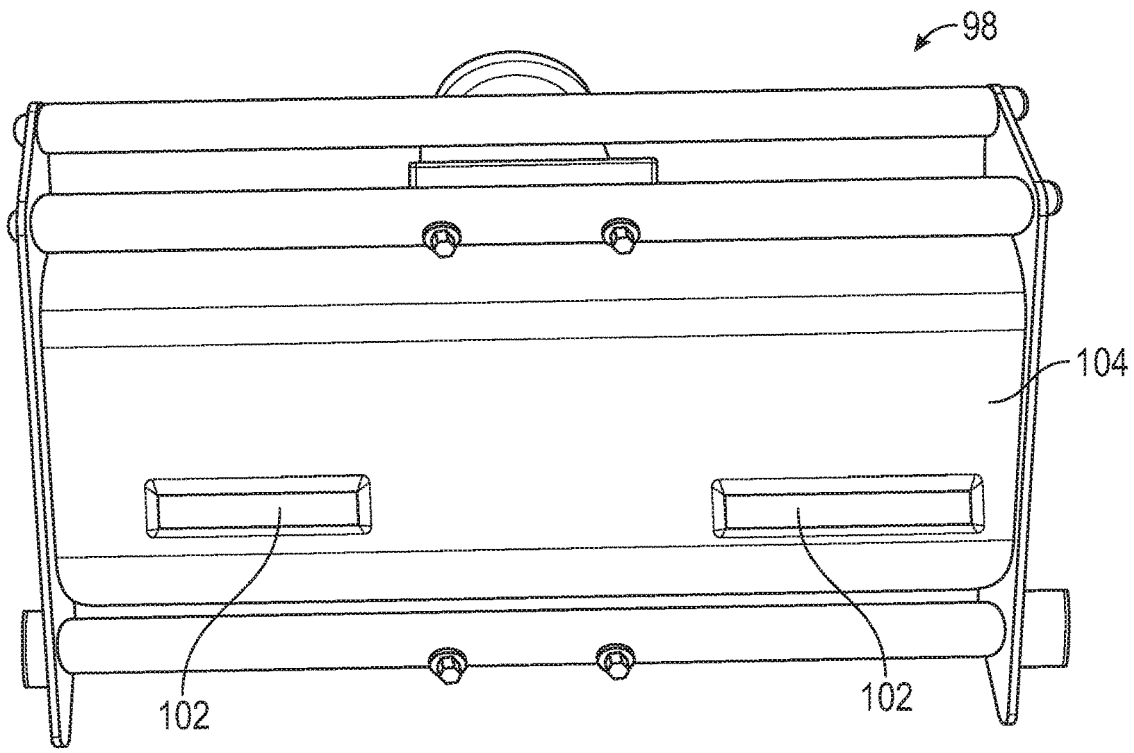
FIG. 16 is a bottom perspective view of the pump apparatus shown in FIG. 15, in accordance with one or more embodiments of the disclosure.

FIG. 15 is a top perspective view of a pump apparatus 98, in accordance with one or more embodiments of the disclosure. Pump apparatus 98 is similar to pump apparatus 85 of FIG. 13. In this embodiment, however, pump apparatus 98 has an enclosed pump housing 100. Pump housing 100 has a closed configuration in contrast to pump housing 18 of FIGS. 2, 3 and 13. Also, in contrast to fluid inlet openings 22 of pump apparatus 10 of FIGS. 2 and 3, and pump apparatus 85 of FIG. 13, pump apparatus 98 of FIG. 15 has fluid inlet openings 102 on a bottom surface 104 of pump housing 100, as shown in FIG. 16. Pump apparatus 98 of FIG. 15 is similar to pump apparatus 85 of FIG. 13 in the sense that pump apparatus 98 is configured to operate in a dual-pump configuration. In this regard, hydraulic fluid is supplied to hydraulic pumps 16a and 16b through respective fluid connection ports 28a and 28b from a common input supply line 86 that is connected to fluid connection ports 28a and 28b in a parallel connection using respective supply hoses 88a and 88b. Similarly, hydraulic fluid may be removed from respective hydraulic pumps 16a and 16b through fluid connection ports 28c and 28d from a common fluid return line 90 that is connected to respective return hoses 92a and 92b.

FIG. 16 is a bottom perspective view of pump apparatus 98 shown in FIG. 15, in accordance with one or more embodiments of the disclosure. As mentioned above, pump apparatus 98 has fluid inlet openings 102 on a bottom surface 104 of pump housing 100, in contrast to the fluid inlet openings 22 of pump apparatus 10 of FIGS. 1 and 2, and pump apparatus 85 of FIG. 13. The placement of fluid inlet openings 102 on a bottom surface 104 may be advantageous for certain applications. Table 1, below, provides one possible set of specifications for pump apparatus 98 of FIGS. 15 and 16, and FIG. 17 shows a plot 106 of performance data of pump apparatus 98 in accordance with these specifications, as described in greater detail below.

TABLE 1

| | |
|---|---|
| weight: | 61 pounds |
| max water flow: | 590 gallons/minute |
| vertical head: | 250 feet (max) |
| operating pressure: | 2,250 psi to 3,300 psi |
| hydraulic flow: | 4 to 28 gallons/minute |
| power source: | hydraulic driven |
| material: | aluminum |
| discharge: | 3" male cam lock |
| dimensions | 24" × 10" × 11" |
| hydraulic oil | AW-32 or AW-46 |

Figure 17:
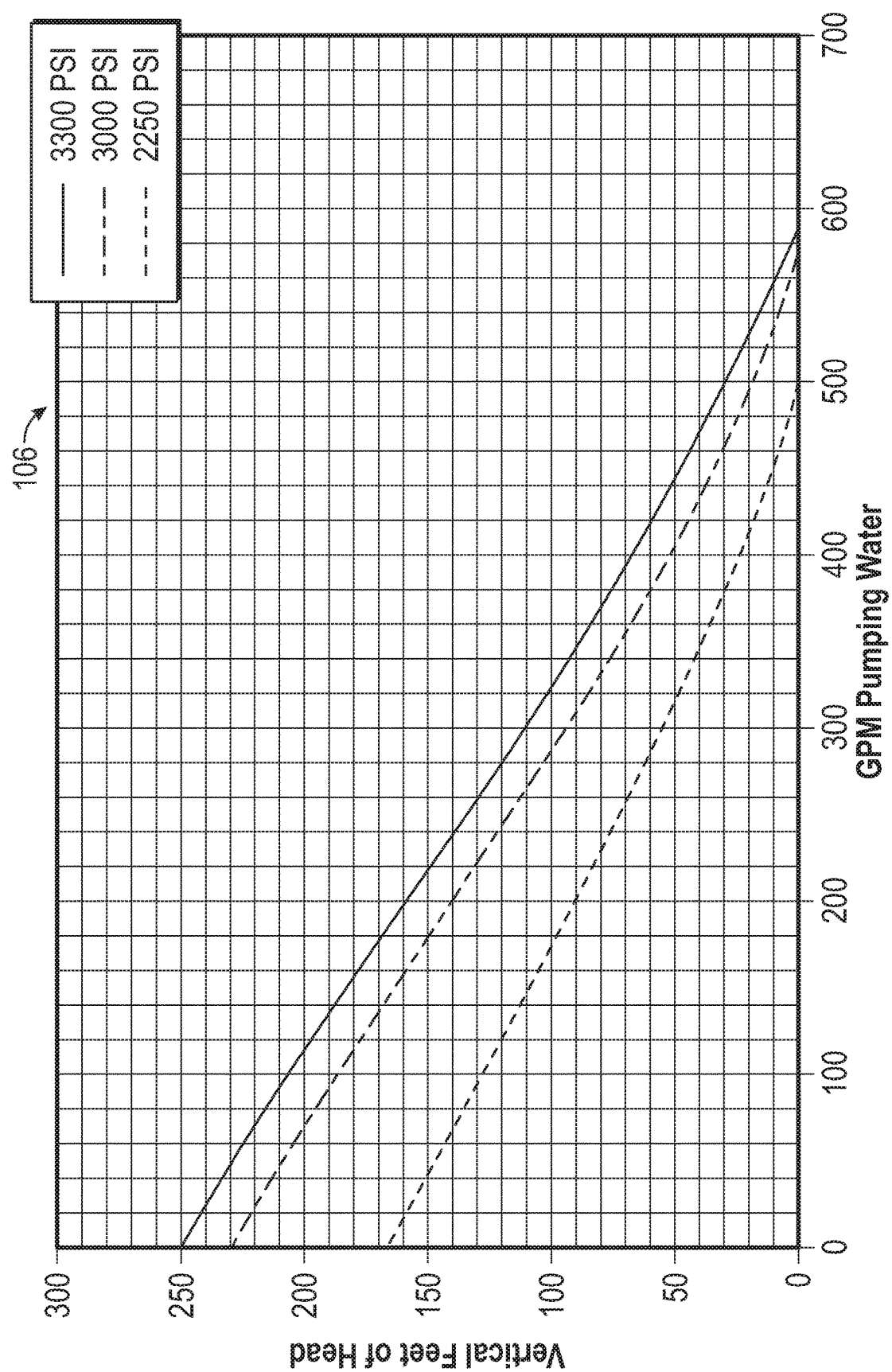
FIG. 17 is a plot of performance data of a pump apparatus, in accordance with one or more embodiments of the disclosure.

FIG. 17 is a plot 106 of performance data of pump apparatus 98 shown in FIGS. 15 and 16, in accordance with one or more embodiments of the disclosure. Plot 106 illustrates the relationship between pressure, flow rate, and vertical head for pump apparatus 98. In this example, the maximum height that may be obtained is approximately 250 feet, at a pressure of 3,300 psi, at a virtually zero flow rate. In this regard, the applied pressure of 3,300 psi is entirely used to support the weight of a column of water having a height of 250 feet with no additional pressure available to generate a flow of water. At the same pressure of 3,300 psi, however, a non-zero flow rate may be generated for a shorter column of water. In this example, a pressure of 3,300 psi may generate a flow of approximately 120 gallons/minute for a column of water that is 200 feet high, as shown in FIG. 17. Similarly, for the same pressure of 3,300 psi, larger flow rates may be achieve for shorter columns of water up to a maximum of approximately a flow rate of 590 gallons/minute for a column of water that has approximately zero height.

Plot 106 of FIG. 17 shows two other curves, one for 3,000 psi, and one for 2,250 psi. For each lower pressure (i.e., 3,000 psi and 2,250 psi) a shorter column of water may be generated for a given flow rate. With decreasing pressure, the maximum height of a column of water that may be generated decreases. For example, at 3,000 psi the maximum height of a column of water is approximately 230 feet, while for 2,250 psi the maximum height is approximately 165 feet. Similarly, with decreasing pressure, the maximum flow rate decreases. For example, for 3,000 psi the maximum flow rate is approximately 570 gallons/minute, while for 2,250 psi the maximum flow rate is approximately 500 gallons/minute. Thus, for a given depth of tank, pit, or pond that needs to be pumped, increasing the pressure increases the flow rate. That is, with increasing depths of a tank, pit, or pond that needs to be pumped, greater pressures are required to generate a specified flow rate.

Pump apparatus 98 is driven by hydraulic motors 16a and 16b that are operated by providing forced hydraulic fluid at a flow rate of between approximately 4 gallons/minute and 20 gallons/minute. In this regard, pump apparatus 98 may be operated at a fixed pressure with variable flow rate of hydraulic fluid. For example, the pump apparatus 98 may be operated at a pressure of approximately 3,000 psi and as the flow rate of hydraulic fluid is increased, the impeller spins more quickly leading to increased pump output. Pump apparatus 98 includes hydraulic motors 16a and 16b that are configured to operate with a fixed displacement that may operate at varying pressures and varying hydraulic flow rates. According to an embodiment, the pressure may be fixed (e.g., at 3,000 psi) by setting a relief valve (not shown). Motors 16a and 16b are rated to 3500 psi continuous duty.

Figure 18:
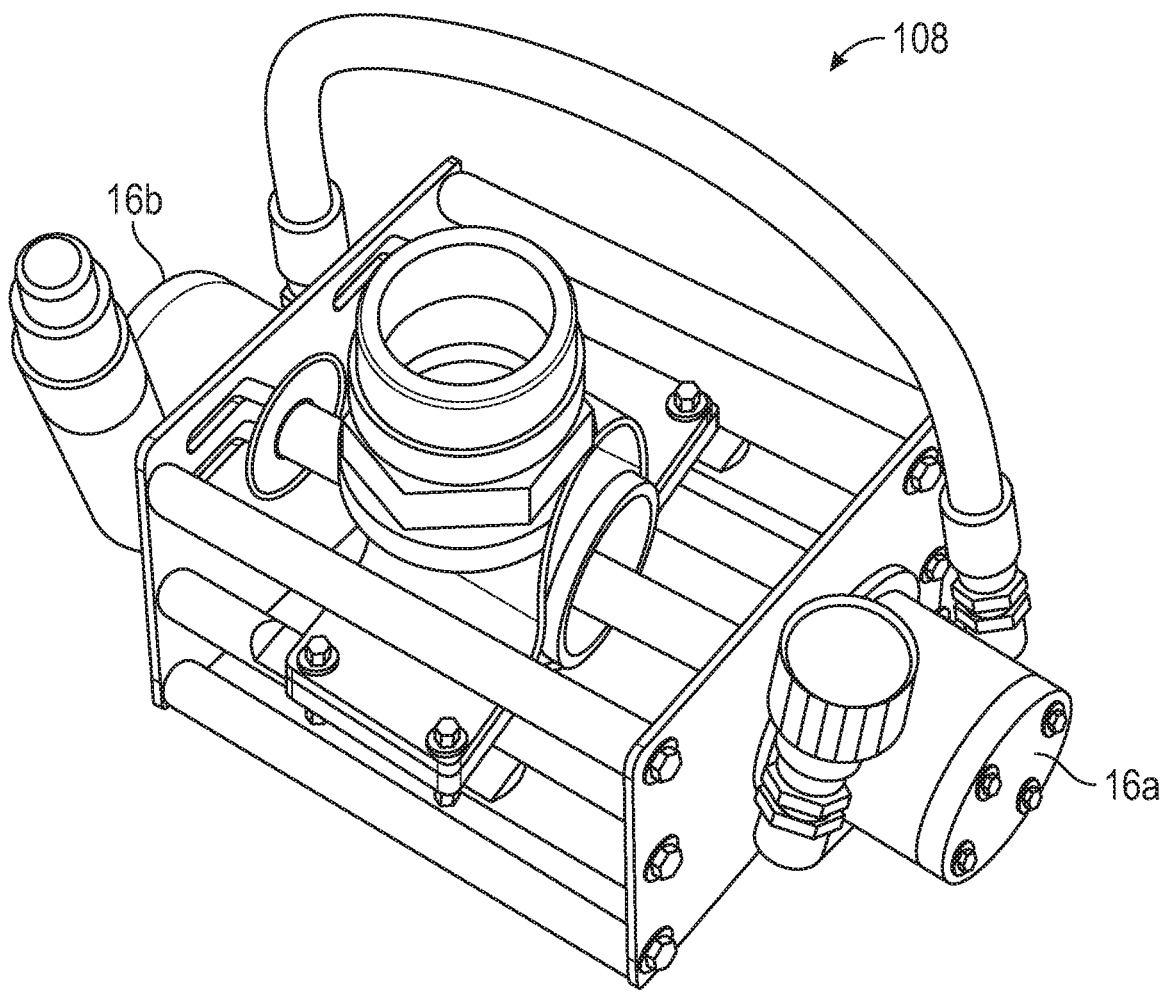
FIG. 18 is a top perspective view of a pump apparatus, in accordance with one or more embodiments of the disclosure.
Figure 19:
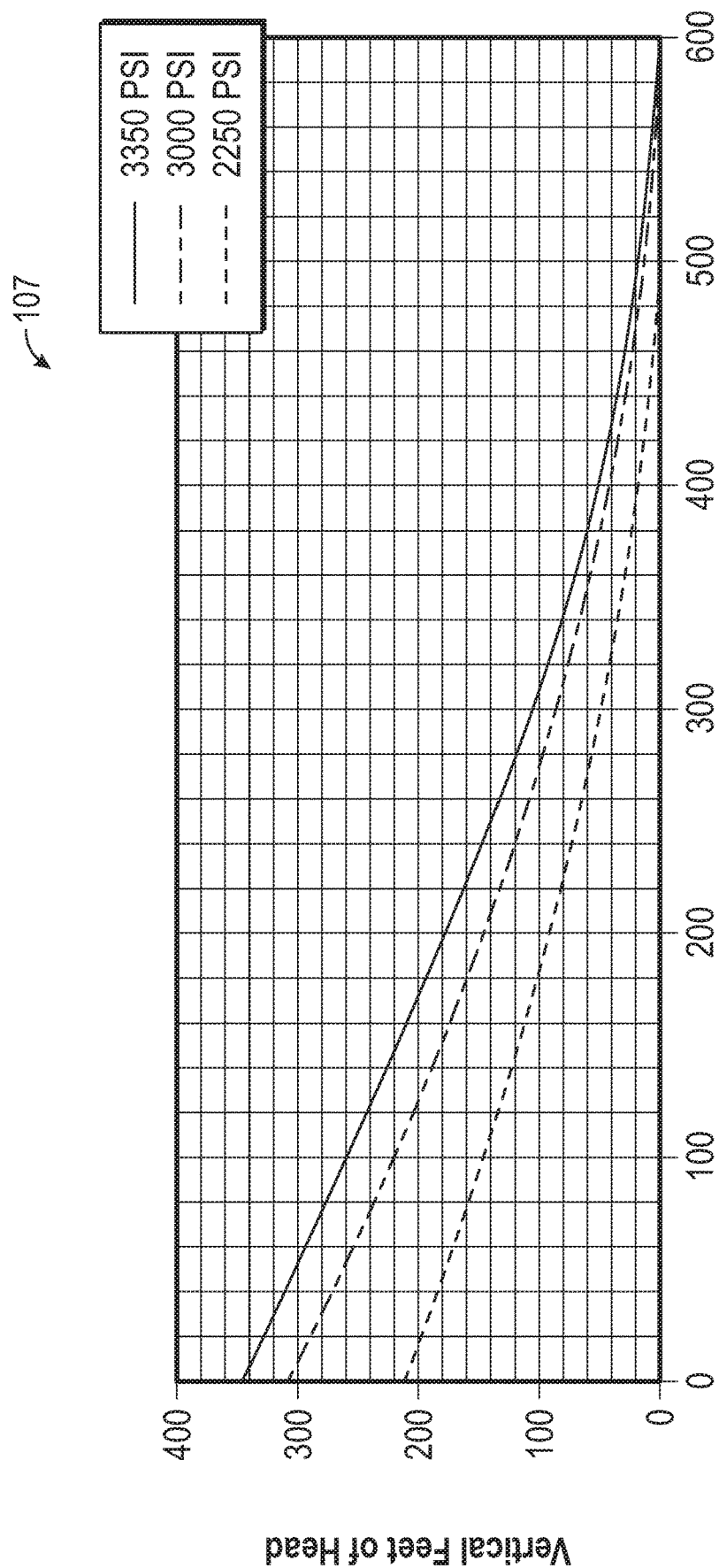
FIG. 19 is a plot of performance data of a pump apparatus, in accordance with one or more embodiments of the disclosure.

FIG. 18 is a top perspective view of a pump apparatus 108, in accordance with one or more embodiments of the disclosure. Pump apparatus 108 is similar to pump apparatus 94 shown in FIG. 14. As with pump apparatus 94, described above and illustrated with reference to FIG. 14, pump apparatus 108 uses a single hydraulic motor 16a (e.g., see FIG. 27 and related description below) that does the work of driving an impeller (not shown) to pump water and other fluids. The second hydraulic motor 16b (e.g., see FIG. 28 and related description below) has its drive gear removed and therefore acts as a frictionless bearing. Hydraulic fluid is first fed to hydraulic motor 16a and then fed to hydraulic motor 16b as described above. Table 2, below, provides one possible set of specifications for pump apparatus 108 of FIG. 18, and FIG. 19 shows a plot 107 of performance data of pump apparatus 98 in accordance with these specifications, as described in greater detail below.

TABLE 2

| | |
|---|---|
| weight: | 70 pounds |
| max water flow: | 600 gallons/minute |
| vertical head: | 350 feet (max) |
| operating pressure: | 2,250 psi to 3,300 psi |
| hydraulic flow: | 8 to 21 gallons/minute |
| power source: | hydraulic driven |
| material: | ductile iron |
| discharge: | 3" male cam lock |
| dimensions | 29" × 10" × 12" |
| hydraulic oil | AW-32 or AW-46 |

Both hydraulic motors 16a and 16b in pump apparatus 108 are lubricated and cooled by the continuous flow of hydraulic fluid. This allows pump apparatus 108 to be operated in hot fluid service applications. For example, a pump apparatus 108 may be used in a hot operating environment such as a coke pit that often has temperatures on the order of 300° F. Pump apparatus 108 is superior to conventional pumps that include bearings that have grease lubricant that would be quickly washed away at such hot environments. As mentioned above, a pump apparatus, such as pump apparatus 108, is superior to conventional pumps because of the lack of conventional mechanical seals, internal bearings, wear plates, and friction. Pump apparatus 108 can be run dry for extended periods of time without suffering damage. A conventional pump can run dry for only a few minutes before suffering serious damage.

FIG. 19 is a plot 107 of performance data of pump apparatus 108 shown in FIG. 18, in accordance with one or more embodiments of the disclosure. The three curves corresponding to pressures of 3,350 psi, 3,000 psi, and 3,000 psi, shown in the plot 107 of FIG. 19 have similar shapes to those curves in plot 106 of FIG. 17. In this example, however, pump apparatus 108 is able to pump fluids from greater depths than pump apparatus 98 of FIGS. 15 and 16. In this regard, pump apparatus 108 is able to generate a maximum vertical head of 350 feet compared to the maximum head of 250 feet of pump apparatus 98.

Pump apparatus 108 is driven by hydraulic motors 16a and 16b that are operated by providing forced hydraulic fluid at a flow rate of between approximately 4 gallons/minute and 20 gallons/minute in a series flow configuration. If motors 16a and 16b were configured in a parallel configuration, with both motors working to drive the impeller, the hydraulic fluid flow rate, required for similar pump output, would be doubled to a rate between approximately 4 gallons/minute to 40 gallons/minute. Such a parallel configuration would provide increased torque and would thereby increase the vertical head performance from approximately 300 feet to 350 feet.

Figure 20:
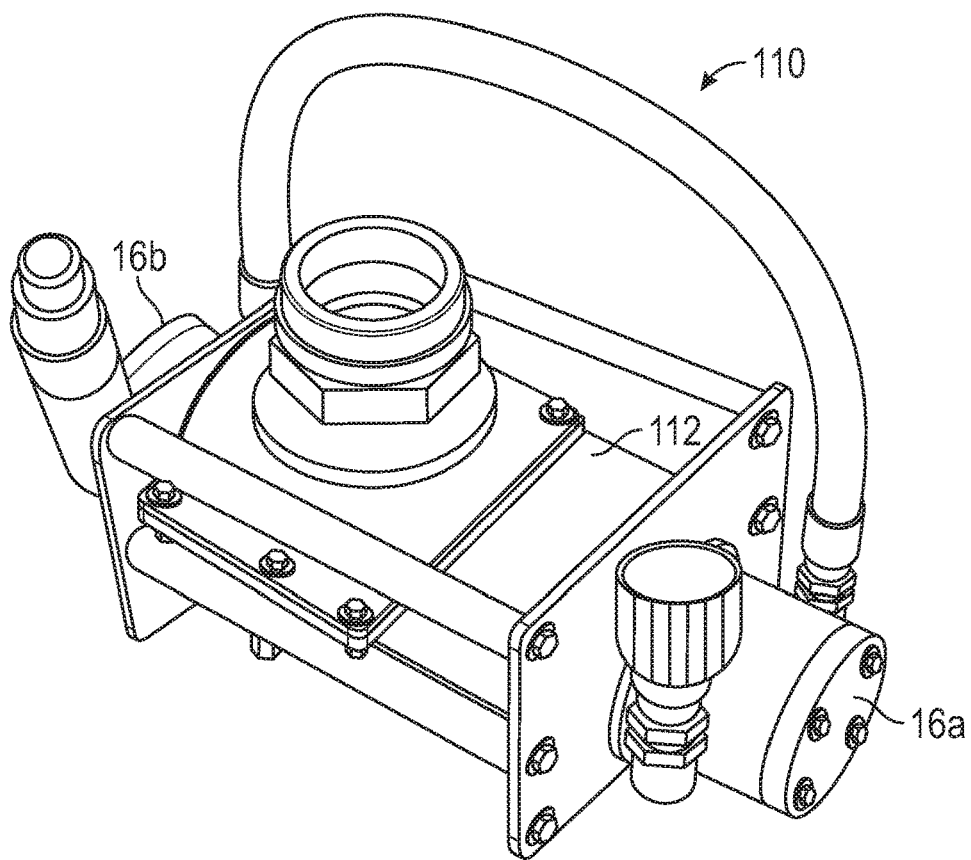
FIG. 20 is a top perspective view of a pump apparatus, in accordance with one or more embodiments of the disclosure.

FIG. 20 is a top perspective view of a pump apparatus 110, in accordance with one or more embodiments of the disclosure. Pump apparatus 110 is similar to pump apparatus 94 (e.g., see FIG. 14) and pump apparatus 108 (e.g., see FIG. 18). As with pump apparatus 94 and pump apparatus 108, described above and illustrated with reference to FIGS. 14 and 18, pump apparatus 110 uses a single hydraulic motor 16a that does the work of driving an impeller (not shown) to pump water and other fluids. The second hydraulic motor 16b has its drive gear removed and therefore acts as a frictionless bearing. Hydraulic fluid is first fed to hydraulic motor 16a and then fed to hydraulic motor 16b as described above. Pump apparatus 110 differs from that of pump apparatus 108, however, in that it has a closed pump housing 112 that is similar to the closed pump housing 100 of pump apparatus 98, shown in FIGS. 15 and 16, and described in greater detail above.

Figure 21:
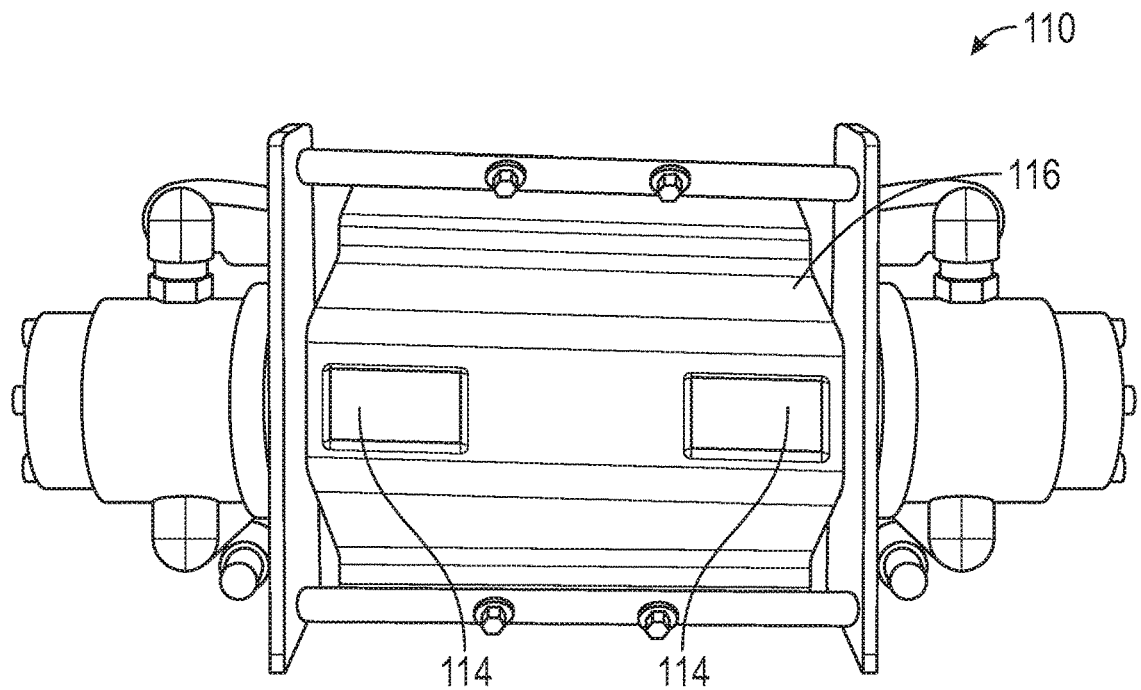
FIG. 21 is a bottom perspective view of the pump apparatus shown in FIG. 20, in accordance with one or more embodiments of the disclosure.

FIG. 21 is a bottom perspective view of pump apparatus 110 shown in FIG. 20, in accordance with one or more embodiments of the disclosure. As shown in FIG. 21, pump housing 112 is similar to pump housing 100 of pump apparatus 98 in that it has fluid inlet openings 114 on a bottom surface 116 of pump housing 112. As with pump apparatus 98 of FIGS. 15 and 16, the presence of fluid inlet openings 114 on the bottom surface 116 may be advantageous for certain pumping situations depending on the type of fluids to be pumped and the types of debris or other solid or semi-solid material present in the fluid to be pumped. Although pump housing 100 is different than other embodiments, described above, pump apparatus 110 also includes a double suction configuration that is similar to other pump apparatus embodiments described above. With the bottom surface inlet openings 114, pump apparatus 110 is configured to pump a tank down to less than one inch of fluid.

Figure 22:
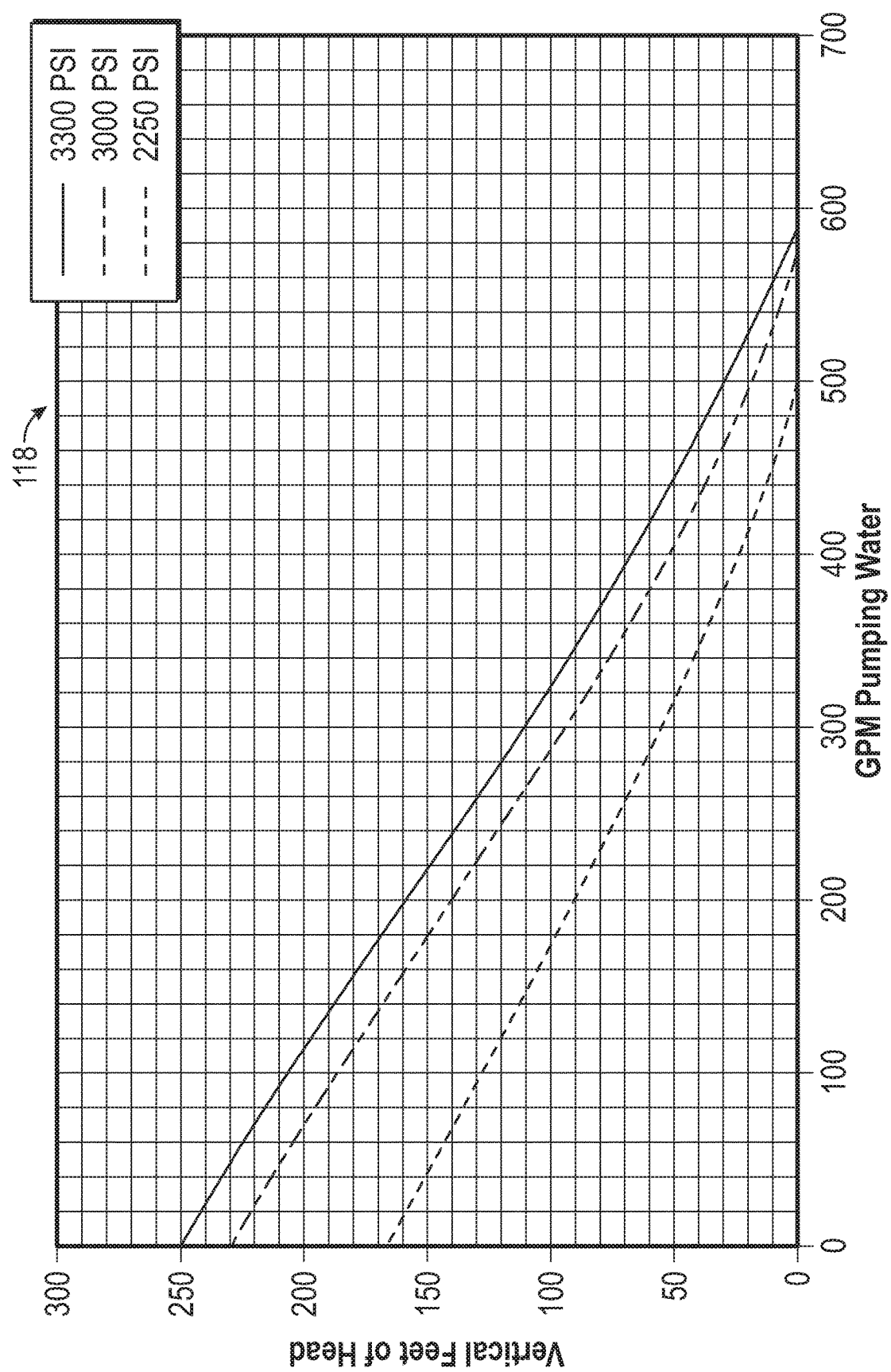
FIG. 22 is a plot of performance data of a pump apparatus, in accordance with one or more embodiments of the disclosure.

Table 3, below, provides one possible set of specifications for pump apparatus 110 of FIGS. 20 and 21, and FIG. 22 provides a plot 118 of performance data of pump apparatus 110 in accordance with these specifications, as described in greater detail below.

TABLE 3

| weight: | 85 pounds |
| max water flow: | 550 gallons/minute |
| vertical head: | 250 feet (max) |
| operating pressure: | 2,250 psi to 3,300 psi |
| hydraulic flow: | 4 to 28 gallons/minute |
| power source: | hydraulic driven |
| material: | ductile iron |
| discharge: | 3" male cam lock |
| dimensions | 24" × 10" × 11" |
| hydraulic oil | AW-32 or AW-46 |

FIG. 22 is a plot 118 of performance data of pump apparatus 110 shown in FIGS. 20 and 21, in accordance with one or more embodiments of the disclosure. Plot 118 of FIG. 22 is similar to that of plot 106 of FIG. 17. As such, the performance of pump apparatus 110, shown in FIGS. 20 and 21, is similar to pump apparatus 98, shown in FIGS. 15 and 16. In this regard, both pump apparatus 98 and pump apparatus 110 are able to pump fluids from depths down to 250 feet. While pump apparatus 98 is able to achieve a higher flow rate (i.e., 590 gallons/minute) compared to the flow rate (i.e., 550 gallons/minute) of pump apparatus 110, pump apparatus 110 may have advantages over pump apparatus 98 for certain applications. In this regard, pump apparatus 110 may be easier to maintain and may suffer less wear and tear due to the presence of the single hydraulic motor 16a that drives the impeller (not shown) versus the two hydraulic motors 16a and 16b of pump apparatus 98 shown in FIGS. 15 and 16.

FIGS. 23A, 23B, and 23C show three views of a lifting ring 120 that may be used with the various disclosed pump apparatuses, in accordance with one or more embodiments of the disclosure. FIG. 24 is a two-dimensional projection view of lifting ring 120 shown in FIGS. 23A to 23C, in accordance with one or more embodiments of the disclosure. Lifting ring 120 may be attached to a pump apparatus for lifting and/or lowering of the pump apparatus, as described in greater detail with reference to FIG. 25 below.

Figure 25:
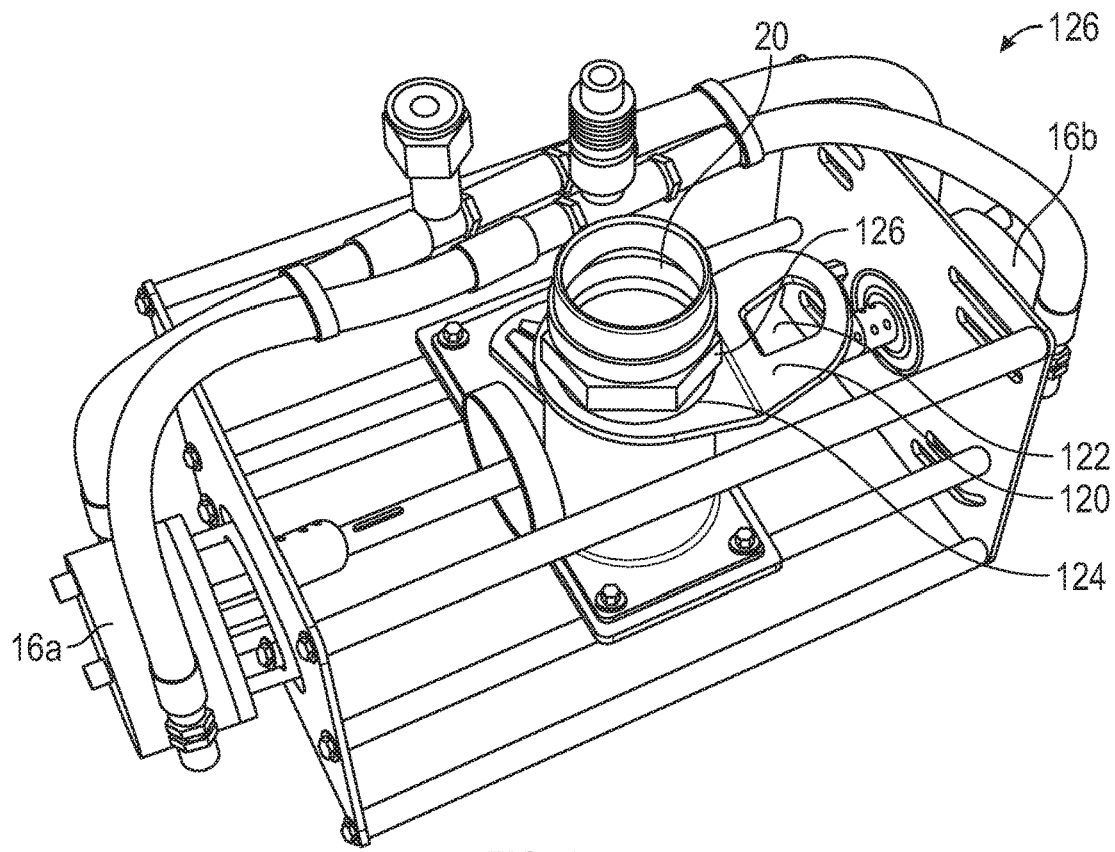
FIG. 25 is a top perspective view of a pump apparatus having a lifting ring, in accordance with one or more embodiments of the disclosure.

FIG. 25 is a top perspective view of a pump apparatus 126 having a lifting ring 120, in accordance with one or more embodiments of the disclosure. Pump apparatus 126 is similar to pump apparatus 85 described above with reference to FIG. 13. In this example, lifting ring 120 is installed on pump apparatus 126 such that hole 124 (e.g., see FIGS. 23A to 24) fits around a discharge tube of discharge outlet 20. Discharge outlet 20 may be provided with a fitting 126 that is slightly larger than a diameter of hole 124 so that lifting ring engages with, and is secured by fitting 126. Fitting 126 may be a removable fitting that may be configured to have a threaded coupling that engages with the discharge tube of discharge outlet 20. Starting from the configuration shown in FIG. 25, lifting ring 120 may be removed by unscrewing and removing fitting 126 and then by sliding lifting ring 120 from the discharge tube of discharge outlet 20. A similar procedure, used in reverse, may be used to install lifting ring 120. Once installed, as shown in FIG. 25, lifting ring 120 may then be used to lift pump apparatus 126 as follows.

Hole 122 (e.g., see FIGS. 23A to 24) of lifting ring 120 may be used to couple lifting ring 120 to a lifting and/or lowering mechanism such as a chain, a cable, a wire, a rope, or any other mechanism that may be used for lifting and/or lowering pump apparatus 126 (not shown). Lifting ring 120 may then be used to lift pump apparatus 126 so that pump apparatus 126 may be lowered into position into a tank, pit, or pond (or alternatively, pump apparatus 126 may be lifted and removed from such a tank, pit, etc.). For example, the lifting mechanism may be passed through hole 122 of lifting ring 120. Alternatively, a hook (not shown) may be attached to lifting ring 120 by passing the hook through hole 122 of lifting ring 120. Once engaged with hole 122 of lifting ring 120, a force may be applied to the chain, cable, wire, rope, hook, etc., to thereby lift pump apparatus 126.

Figure 26:
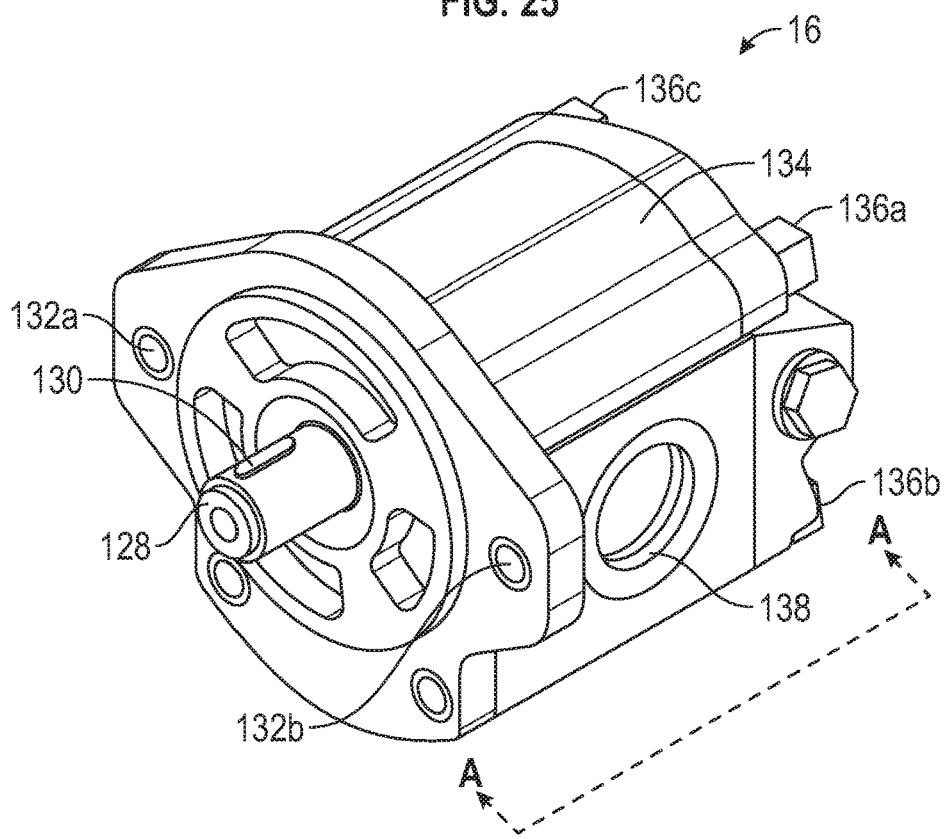
FIG. 26 is a top perspective view of a hydraulic pump, in accordance with one or more embodiments of the disclosure.

FIG. 26 is a top detailed perspective view of a hydraulic motor 16, in accordance with one or more embodiments of the disclosure. Hydraulic motor 16 of FIG. 26 is similar to hydraulic motors 16 shown in FIGS. 1 to 3, and is similar to hydraulic motors 16a and 16b shown in FIGS. 13 to 15, 18, 20, and 25. Hydraulic motor 16 has a motor shaft 128 that is configured to mechanically engage with an impeller drive shaft, such as drive shaft 70, described above with reference to FIGS. 9 to 12. Motor shaft 128 may be configured with a key 130 that is configured to engage with keyway 84 of drive shaft 70 as shown, for example, in FIG. 11. In this regard, motor shaft 128 may be configured to fit inside bored hole region 82 of drive shaft 70. As described above, with reference to FIGS. 10 to 12, motor shaft 128 may further engage with drive shaft 70 through a compression fitting in which a compression ring (not shown) provides a compressive force to ends (e.g., ends 78a and 78b of FIG. 10) of drive shaft 70. The presence of cut regions 80a and 80b (e.g., see FIG. 10) allows end regions 78a and 78b of drive shaft 70 to mechanically deform to thereby provide a compressive force that further couples drive shaft 70 to motor shaft 128.

Hydraulic motor 16, shown in FIG. 26, further includes mechanical fastening apertures 132a and 132b that may be used to fasten hydraulic motor 16 to end plates 12 of a motor housing (e.g., see end plates 12 shown in FIGS. 1 to 3). In this regard, apertures 132a and 132b may be threaded screw apertures that may be configured to mechanically engage with a screw or bolt fastener (not shown). Hydraulic motor 16 includes a cover 134 that may be permanently or removably secured to hydraulic motor 16. Cover 134 may be secured to hydraulic motor 16 using various types of fasteners. In this example, cover 134 is secured to hydraulic motor using bolts 136a, 136b, 136c, and 136d (not shown in this view). Cover 134 includes a fluidic port 138 that may serve as an inlet or an outlet for hydraulic fluid that may be supplied to hydraulic motor 16. Fluidic port 138 may couple to fluid connection ports 28 (e.g., see FIGS. 1 to 3) and to fluid connection ports 28a and 28b (e.g., see FIGS. 13 to 15).

Figure 27:
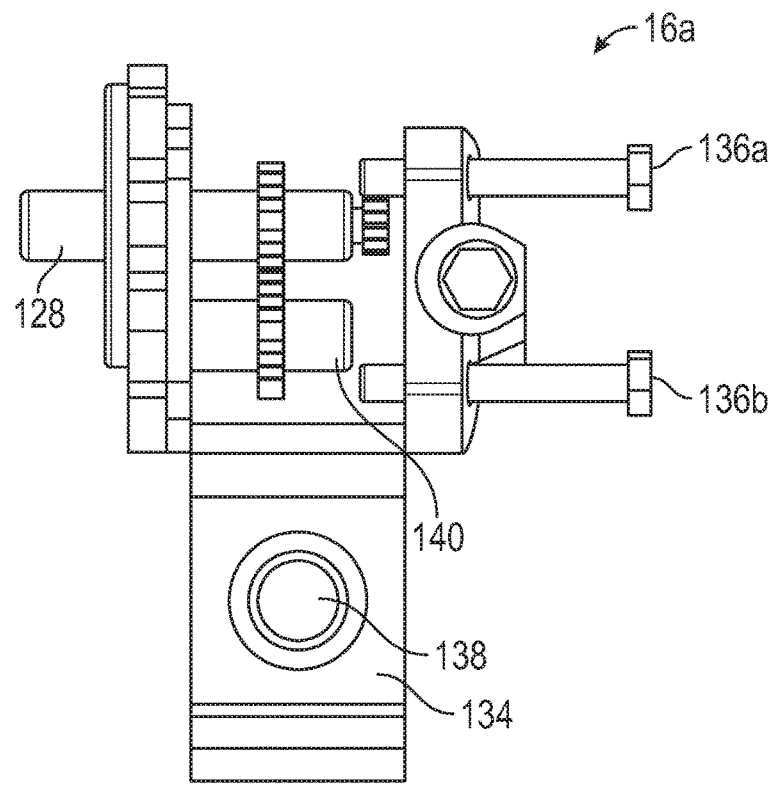
FIG. 27 is a side view of a hydraulic pump, in accordance with one or more embodiments of the disclosure.

FIG. 27 is a side view of a hydraulic motor 16a, in accordance with one or more embodiments of the disclosure. The view of FIG. 27 is defined by section A shown in FIG. 26. Hydraulic motor 16a is similar to hydraulic motor 16a described above with reference to FIGS. 14 and 18 having a drive gear 140. FIG. 27 shows hydraulic motor 16a in a configuration in which bolts (e.g., bolts 136a and 136b) have been unscrewed and have been moved into a disengaged configuration. In this way, cover 134 has been removed from hydraulic motor 16a to show an internal configuration of hydraulic motor 16a. Hydraulic motor 16a has a motor shaft 128 that is mechanically engaged with drive gear 140. During operation, hydraulic fluid flowing into hydraulic motor 16a through fluidic port 138 generates rotational motion of the drive gear 140. Through the mechanical coupling between drive gear 140 and motor shaft 128, rotational motion of drive gear 140 is transferred to motor shaft 128. In turn, motor shaft 128 transmits rotational motion to a drive shaft (not shown) (e.g., drive shaft 70 of FIGS. 9 to 12), which in turn, transmits rotational motion from the drive shaft to an impeller (not shown) (e.g., impeller 40 of FIG. 4). In this way, forced motion of hydraulic fluid into hydraulic motor 16a may perform work on an impeller which may, in turn, cause fluids to be pumped by the impeller.

Figure 28:
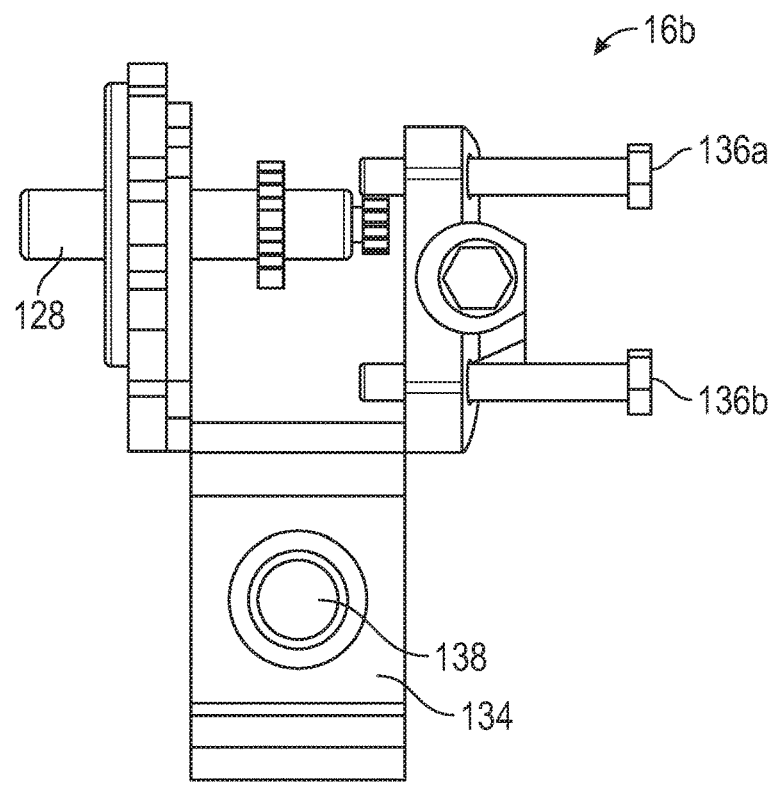
FIG. 28 is a side view of a hydraulic pump, in accordance with one or more embodiments of the disclosure.

FIG. 28 is a side view of a hydraulic motor 16b, in accordance with one or more embodiments of the disclosure. Hydraulic motor 16b is similar to hydraulic motor 16b described above with reference to FIGS. 14 and 18 in that hydraulic motor 16b does not have a drive gear. FIG. 28 shows hydraulic motor 16b in a disassembled configuration similar to the configuration of hydraulic motor 16a shown in FIG. 27. In this regard, bolts (e.g., bolts 136a and 136b) have been unscrewed and moved to a disengaged configuration. Further, cover 134 has been removed from hydraulic motor 16b to show an internal configuration of hydraulic motor 16b. As shown in FIG. 28, hydraulic motor 16b has a motor shaft 128. In contrast to hydraulic motor 16a of FIG. 27, however, there is no drive gear corresponding to drive gear 140 of hydraulic motor 16a. In this regard, fluid flowing into hydraulic motor 16b through fluidic port 138 does not generate rotational motion of motor shaft 128.

In this configuration, motor shaft 128 of hydraulic motor 16b (e.g., see FIG. 28) does not perform mechanical work on a drive shaft, but rather, serves as a frictionless bearing for a drive shaft. In this regard, motor shaft 128 may be connected to one end of a drive shaft (e.g., drive shaft 70 of FIGS. 9 to 12) to provide mechanical support for the drive shaft while allowing rotational motion of the drive shaft. Fluid flowing through hydraulic motor 16b serves to cool and lubricate moving parts in hydraulic motor 16b allowing hydraulic motor 16b to serve as an external frictionless bearing. In this way, a pump such as pump 94 of FIG. 14 or pump 108 of FIG. 18 may run dry without causing friction or heat to motors 16a and 16b. Such a pump apparatus, therefore, cannot be damaged by being run dry, as may be the case with conventional pumps.

Figure 29:
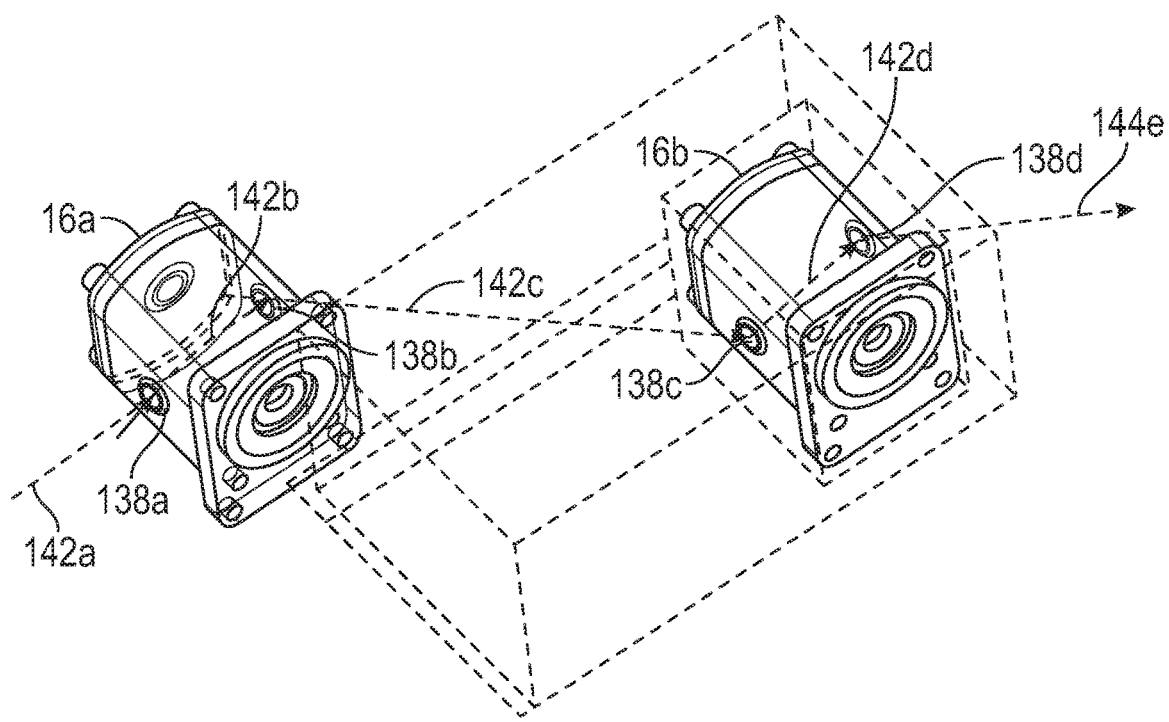
FIG. 29 illustrates a hydraulic fluid flow path through two hydraulic motors, in accordance with one or more embodiments of the disclosure.

FIG. 29 illustrates a possible fluid path through two hydraulic motors, 16a and 16b, in accordance with one or more embodiments of the disclosure. In this example, hydraulic fluid enters hydraulic motor 16a along a first path 142a through fluidic port 138a. Hydraulic fluid then flows over drive gear 140 (e.g., see FIG. 27) along a second path 142b. As hydraulic fluid flows along path 142b, it imparts rotational motion to drive gear 140 (e.g., see FIG. 27). Hydraulic fluid then flows out from hydraulic motor 16a through fluidic port 138b.

Hydraulic fluid may then flow from hydraulic motor 16a to hydraulic motor 16b along path 142c. In practice, fluid path 142c may be provided by a hose, such as supply hose 96 shown in FIG. 14. Hydraulic fluid may then enter hydraulic motor 16b through fluidic port 138c. While within hydraulic motor 16b, hydraulic fluid may flow along path 142d. In this example, hydraulic motor 16b may not have a drive gear, as described in greater detail above with reference to FIG. 28. Along path 142d hydraulic fluid flows from entry fluidic port 138c to exit fluidic port 138d. Hydraulic fluid may then exit from hydraulic motor 16b through fluidic port 138d and flow along path 142e.

Fluid path 142a may represent a fluid path from a source of elevated-pressure hydraulic fluid while fluid path 142e may represent a fluid path that returns reduced-pressure hydraulic fluid to a fluid receptacle. In some embodiments, the fluidic source and receptacle may be part of a single hydraulic power unit (HPU) that provides a continuous flow of hydraulic fluid to hydraulic motors 16a and 16b. In such an embodiment, fluid that is returned to the receptacle may then be re-used and returned to motors 16a and 16b for continued pumping operation.

Figure 30:
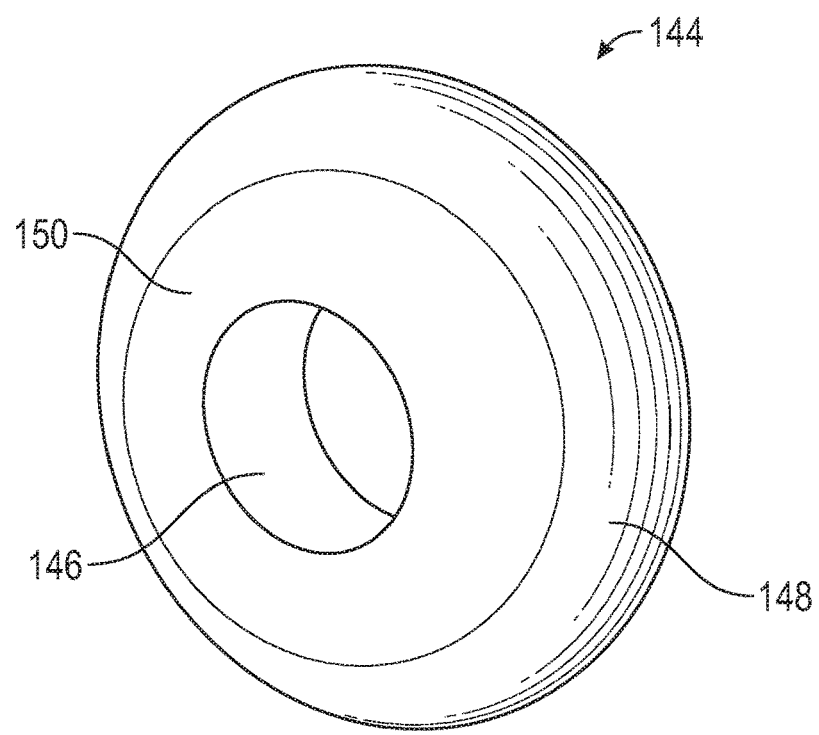
FIG. 30 illustrates a perspective view of a stagnation prevention device, in accordance with one or more embodiments of the disclosure.

FIG. 30 illustrates a perspective view of a stagnation prevention device 144, in accordance with one or more embodiments of the disclosure. Stagnation prevention device 144 may be used to improve the flow of pumped material into inlet openings 22 (e.g., see FIGS. 2 to 4), as described in greater detail below with reference to FIG. 33. In this example, stagnation device 144 is a circular structure with a central hole 146. Stagnation device 144 has a curved surface 148 on a first side and a flat surface (e.g., see FIG. 32 and related description below) on a second side. In this example, the first side further includes a flat surface 150.

Figure 31:
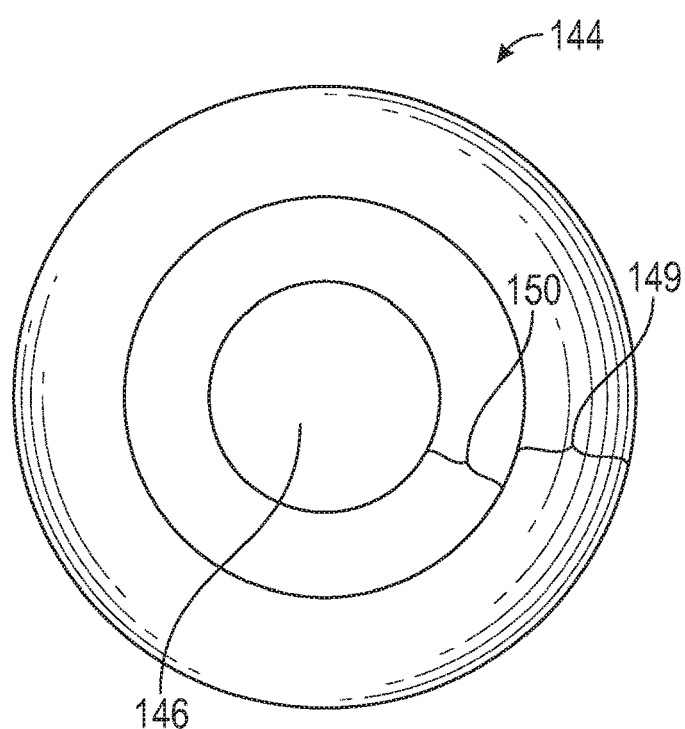
FIG. 31 illustrates a top view of a stagnation prevention device, in accordance with one or more embodiments of the disclosure.

FIG. 31 illustrates a top view of stagnation prevention device 144 shown in FIG. 30, in accordance with one or more embodiments of the disclosure. In this view, flat surface 150 extends over an annular region between the central hole 146 and the curved surface 148. In various embodiments, the flat surface 150 may have a larger or smaller annular extent relative to the curved surface. In one example, the extent of curved surface 148 relative to flat surface 150 may be as shown in FIG. 32 and described in greater detail below.

Figure 32:
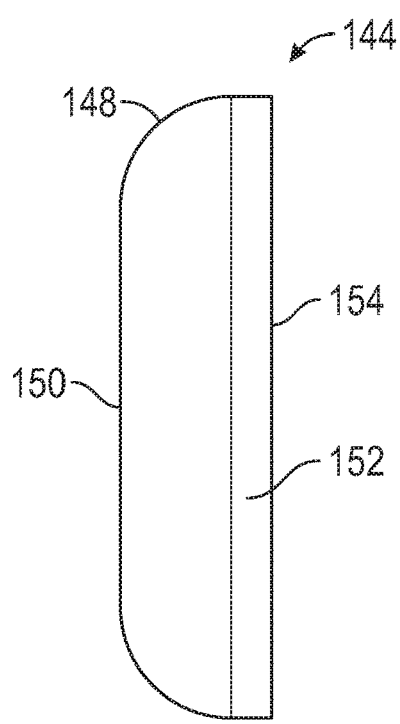
FIG. 32 illustrates a side view of a stagnation prevention device, in accordance with one or more embodiments of the disclosure.

FIG. 32 illustrates a side view of stagnation prevention device 144, shown in FIGS. 30 and 31, in accordance with one or more embodiments of the disclosure. In this example, in addition to curved surface 148 and flat surface 150, stagnation prevention device 144 may further have an additional flat annular surface 152 and a flat bottom surface 154.

Figure 33:
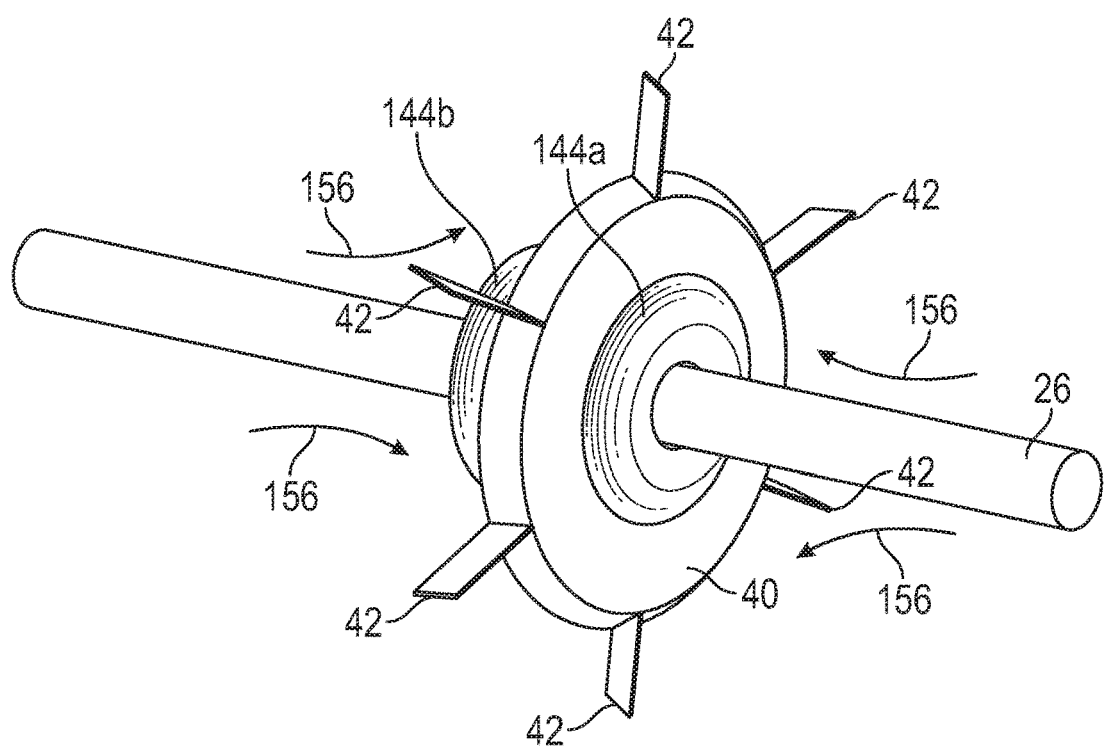
FIG. 33 illustrates a perspective view of two stagnation prevention device devices installed on a drive shaft, in accordance with one or more embodiments of the disclosure.

FIG. 33 illustrates a perspective view of two stagnation prevention device devices, 144a and 144b, installed on a drive shaft 26, in accordance with one or more embodiments of the disclosure. The view of FIG. 33 may be compared with the view of FIG. 4. As shown in FIG. 4, an impeller 40, having blades 42, is installed on drive shaft 26. In this example, central hole 146 (e.g., see FIGS. 30 and 31) of stagnation prevention devices 144a and 144b is configured to have a diameter slightly larger than a diameter of drive shaft 26. In this regard, stagnation prevention devices 144a and 144b may be installed by passing respective ends of drive shaft 26 through respective holes 146 (e.g., see FIG. 30) of stagnation prevention devices, 144a and 144b, on opposing sides of impeller 40. Stagnation prevention devices 144a and 144b may be configured to be installed adjacent to impeller 40 such that flat sides 154 (e.g., see FIG. 32) of stagnation prevention devices 144a and 144b are adjacent to respective flat portions 52 (e.g., see FIG. 5) on opposing sides of impeller 40.

Stagnation prevention devices 144a and 144b may be designed to have a shape that improves fluid flow paths 156 (e.g., see FIG. 33) of fluid being drawn into inlet openings 22 (e.g., see FIG. 4). For example, the geometric features of stagnation prevention devices 144a and 144b, including flat and curved portions (e.g., see curved 148 and flat 150 portions in FIGS. 30 to 32), causes pumped fluid to flow along smoothly curved flow paths (e.g., see flow paths 156 of FIG. 33) with little tendency for stagnation (i.e., stagnation points are positions at which the fluid has relatively low or zero velocity). Specific parameters of the geometry of stagnation devices 144a and 144b, including relative sizes and shapes of curved portion 148, and of flat portions 150 and 152 (e.g., see FIG. 32), may be varied to optimize pumped fluid flow paths to reduce or eliminate fluid stagnation points. Reduction or elimination of fluid stagnation may lead to improved pump performance in terms of greater throughput, reduced power consumption, reduced wear and tear, etc.

A pump apparatus (e.g., pump apparatuses 10, 85, 94, 98, 108, 110, and 126, respectively described above with reference to FIGS. 1 to 4, 13 to 16, 18, 20, 21 and 26) may be operated to pump flowable material from a bottom of a tank, waste pit, or pond, as follows. Hydraulic fluid lines (not shown) may be attached to fluid connection ports (e.g., ports 28 in FIGS. 1 to 3) on each of two hydraulic motors (e.g., motors 16 in FIGS. 1 to 3). Pump apparatus (e.g., apparatus 10 of FIGS. 1 to 3) may then be lowered into a tank, pit, or pond, and may be placed on a bottom surface of the tank, pit, or pond. As described above with reference to FIGS. 23A to 23C and FIG. 24, lifting ring 120 may be used to lift and/or lower a pump apparatus (e.g., see pump apparatus 126 with lifting ring 120, shown in FIG. 25).

Motors (e.g., motors 16 of FIGS. 1 to 3) may then be activated by providing a forced flow of hydraulic fluid to motors through fluid connection ports. Hydraulic motors may then impart rotational motion to a drive shaft (e.g., drive shaft 26 of FIG. 2) that thereby imparts rotational motion to an impeller (e.g., impeller 40 of FIGS. 4 and 5). The impeller then draws flowable material into the pump apparatus which then pumps the flowable material out through a discharge outlet (e.g., discharge outlet 20 of FIG. 1).

As described above, certain embodiments include dual hydraulic motors, 16a and 16b, which drive an impeller, such as pump apparatus 85 (e.g., see FIG. 13) and pump apparatus 98 (e.g., see FIGS. 15 and 16). In contrast, other embodiments include only a single hydraulic motor 16a that drives the impeller, such as pump apparatus 94 (e.g., see FIG. 14), pump apparatus 108 (e.g., see FIG. 18), and pump apparatus 110 (e.g., see FIGS. 20 and 21). In these latter embodiments (i.e., pump apparatus 94, 108, and 110), the second hydraulic motor 16b is configured to have its drive gear removed and thus acts like a frictionless external bearing that is cooled and lubricated by hydraulic fluid flowing through the second hydraulic motor. Such single-motor embodiments may have advantages over dual-motor embodiments for certain applications.

Certain embodiments may provide optional agitators, for example, agitators 34 described above with reference to FIGS. 1 to 3. Agitators may operate to macerate solid waste such as vegetation or other organic matter before flowable material containing such solids enters pump inlet openings. For certain embodiments, agitators may also help to feed solids into a pump housing in relatively high concentration.

The fluid entering intake openings may take the form of a fine slurry having suspended solids of reduced size relative to sizes of suspended solids contained in flowable material before encountering agitators.

The disclosed pump apparatus embodiments are versatile and may be used in a variety of different applications, such as dredging, tank cleaning, pumping abrasive solids from pits, pumping oilfield drilling cement or oilfield waste such as drill cuttings, pumping oilfield fracturing sand, and pumping a mud slurry or a slurry containing vegetation or other organic waste. Optional agitators may be advantageous in increasing an amount of solids, such as sand or drill cuttings, pumped by a pump apparatus.

Conditional language, such as, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The specification and annexed drawings disclose examples of pump apparatuses. The examples illustrate various features of the disclosure, but those of ordinary skill in the art may recognize that many further combinations and permutations of the disclosed features are possible. Accordingly, various modifications may be made to the disclosure without departing from the scope or spirit thereof. Further, other embodiments of the disclosure may be apparent from consideration of the specification and annexed drawings, and practice of disclosed embodiments as presented herein. Examples put forward in the specification and annexed drawings should be considered, in all respects, as illustrative and not limiting. Although specific terms are employed herein, they are used in a generic and descriptive sense only, and not used for purposes of limitation.

What is claimed is:
1. A submersible pump apparatus, comprising:
  a three-dimensional frame;
  a pump housing having a discharge outlet and one or more inlet openings, wherein the pump housing is mounted within the frame;
  a drive shaft mounted within the frame that extends through the pump housing;
  an impeller mounted on the driveshaft within the pump housing;
  a first motor connected to a first end of the drive shaft; and
  a second motor connected a second end of the drive shaft, wherein the drive shaft includes:
    a bored and keyed mechanical opening on an end of the drive shaft that is configured to engage with a motor shaft such that the motor shaft fits inside the opening in the end portion of the drive shaft and forms a mechanical coupling with the motor shaft; and
    a split end and a bored shoulder region of the split end, wherein the split end and the bored shoulder region is configured to form a compression fit with the motor shaft when a compression ring is installed on the bored shoulder region.
2. The submersible pump apparatus of claim 1, wherein the first and second motors are hydraulic motors.

3. The submersible pump apparatus of claim 2, wherein the first and second motors are configured to cooperatively rotate the drive shaft.

4. The submersible pump apparatus of claim 3, further comprising:
a fluidic input connection that is configured to supply hydraulic fluid to the first and second motors to thereby drive the first and second motors; and
a fluidic output connection that is configured to remove hydraulic fluid from the first and second motors.

5. The submersible pump apparatus of claim 4, wherein the fluidic input connection is configured to supply hydraulic fluid to the first and second motors using a parallel fluidic connection, and
wherein the fluidic output connection is configured to remove hydraulic fluid from the first and second motors using a parallel fluidic connection.

6. The submersible pump apparatus of claim 2, wherein the first motor is configured to drive rotational motion of the drive shaft, and the second motor is configured to provide rotational support for the drive shaft but does not drive the drive shaft.

7. The submersible pump apparatus of claim 6, further comprising a fluidic connection that provides forced hydraulic fluid to the first and second motors.

8. The submersible pump apparatus of claim 7, wherein:
the first motor has a drive gear and is configured to drive rotational motion of the drive shaft in response to forced motion of hydraulic fluid flowing through the first motor, and
the second motor does not have a drive gear.

9. The submersible pump apparatus of claim 8, wherein the second motor is configured to receive hydraulic fluid and to be cooled and lubricated by the hydraulic fluid as the hydraulic fluid flows through the second motor.

10. The submersible pump apparatus of claim 9, wherein the fluidic connection has a series configuration that:
supplies hydraulic fluid to the first motor;
removes hydraulic fluid from the first motor and then supplies hydraulic fluid removed from the first motor to the second motor; and
removes hydraulic fluid from the second motor.

11. The submersible pump apparatus of claim 1, further comprising:
two inlet openings that are opposing inlet openings on opposite sides of the pump housing.

12. The submersible pump apparatus of claim 1, further comprising:
one or more downwardly facing inlet openings.

13. The submersible pump apparatus of claim 1, wherein the three-dimensional frame includes two end plates and a plurality of crossbars, wherein each crossbar has two ends, and wherein each end is attached to a respective end plate.

14. The submersible pump apparatus of claim 1, wherein each of the two motors is connected to an exterior surface of a respective end plate.

15. The submersible pump apparatus of claim 1, further comprising one or more stagnation prevention devices that improve fluid flow of pumped liquid and reduce a tendency for fluid stagnation.

16. The submersible pump apparatus of claim 1, wherein the impeller includes two halves that are fastened together such that the two halves are compressed against the driveshaft.

17. The submersible pump apparatus of claim 16, wherein the impeller further includes a keyway that is configured to mechanically engage with a key on the drive shaft.

18. The submersible pump apparatus of claim 1, wherein the drive shaft includes:
a key configured to engage with a keyway of the impeller when the impeller is installed on the drive shaft; and
milled shoulders that confine the impeller when the impeller is installed on the drive shaft.

19. The submersible pump apparatus of claim 1, further comprising a lifting device that is configured to mechanically couple to a lifting mechanism and to transmit a lifting force from the lifting mechanism to the submersible pump apparatus to thereby lift the submersible pump apparatus.

20. A pump apparatus, comprising:
a drive shaft;
an impeller mounted on the drive shaft;
a first motor connected to a first end of the drive shaft; and
a second motor connected a second end of the drive shaft,
wherein the drive shaft includes:
a bored and keyed mechanical opening on an end of the drive shaft that is configured to engage with a motor shaft such that the motor shaft fits inside the opening in the end portion of the drive shaft and forms a mechanical coupling with the motor shaft; and
a split end and a bored shoulder region of the split end, wherein the split end and the bored shoulder region is configured to form a compression fit with the motor shaft when a compression ring is installed on the bored shoulder region.

21. The pump apparatus of claim 20, wherein the first and second motors are configured to cooperatively rotate the drive shaft.

22. The pump apparatus of claim 21, wherein the first and second motors are hydraulic motors, that include:
a fluidic input connection that is configured to supply hydraulic fluid to the first and second motors using a parallel fluidic connection, and
a fluidic output connection that is configured to remove hydraulic fluid from the first and second motors using a parallel fluidic connection.

23. The pump apparatus of claim 20, wherein the first motor is configured to drive rotational motion of the drive shaft, and the second motor is configured to provide rotational support for the drive shaft but does not drive rotational motion of the drive shaft.

24. The pump apparatus of claim 23, wherein the first and second motors are hydraulic motors, that include:
a fluidic connection having a series configuration that:
supplies hydraulic fluid to the first motor;
removes hydraulic fluid from the first motor and then supplies hydraulic fluid removed from the first motor to the second motor; and
removes hydraulic fluid from the second motor.

25. A method of operating a pump apparatus, the method comprising:
imparting rotational motion to an impeller using both a first and a second motor of the pump apparatus,
wherein the first motor is connected to a first end of a drive shaft on which the impeller is mounted, and
wherein the second motor is connected to a second end of the drive shaft,
wherein the drive shaft includes:
a bored and keyed mechanical opening on an end of the drive shaft that is configured to engage with a motor shaft such that the motor shaft fits inside the opening in the end portion of the drive shaft and forms a mechanical coupling with the motor shaft; and
a split end and a bored shoulder region of the split end, wherein the split end and the bored shoulder region is configured to form a compression fit with the motor shaft when a compression ring is installed on the bored shoulder region.

26. The method of claim 25, wherein the first and second motors are hydraulic motors, the method further comprising:
supplying hydraulic fluid to the first and second motors using a parallel fluidic input connection, and
removing hydraulic fluid from the first and second motors using a parallel fluidic output connection.

\* \* \* \* \*